(12) United States Patent
Aramaki

(10) Patent No.: US 9,516,193 B2
(45) Date of Patent: Dec. 6, 2016

(54) CONTACT IMAGE SENSOR, OUTPUT CORRECTION DEVICE FOR CONTACT IMAGE SENSOR, AND OUTPUT CORRECTION METHOD FOR CONTACT IMAGE SENSOR

(71) Applicant: Mitsubishi Electric Corporation, Chiyoda-ku (JP)

(72) Inventor: Tohru Aramaki, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/418,185

(22) PCT Filed: Jul. 10, 2013

(86) PCT No.: PCT/JP2013/068833
§ 371 (c)(1),
(2) Date: Jan. 29, 2015

(87) PCT Pub. No.: WO2014/024623
PCT Pub. Date: Feb. 13, 2014

(65) Prior Publication Data
US 2015/0156372 A1 Jun. 4, 2015

(30) Foreign Application Priority Data

Aug. 10, 2012 (JP) .................................. 2012-178137

(51) Int. Cl.
*H04N 1/401* (2006.01)
*H04N 1/028* (2006.01)
(Continued)

(52) U.S. Cl.
CPC ............ *H04N 1/401* (2013.01); *H04N 1/0288* (2013.01); *H04N 1/02835* (2013.01); *H04N 1/02885* (2013.01); *H04N 1/02895* (2013.01); *H04N 1/0318* (2013.01); *H04N 1/40056* (2013.01)

(58) Field of Classification Search
CPC ............. H04N 1/401; H04N 1/02835; H04N 1/0288; H04N 1/02885; H04N 1/02895; H04N 1/0318; H04N 1/40056
See application file for complete search history.

(56) References Cited

U.S. PATENT DOCUMENTS

2011/0261418 A1* 10/2011 Yamamura ......... H04N 1/02815
358/474
2012/0113481 A1    5/2012 Ootsu

FOREIGN PATENT DOCUMENTS

EP          1 017 221 A1    7/2000
JP             54 5323       1/1979
(Continued)

OTHER PUBLICATIONS

International Search Report Issued Oct. 15, 2013 in PCT/JP13/068833 Filed Jul. 10, 2013.
(Continued)

*Primary Examiner* — Iriana Cruz
(74) *Attorney, Agent, or Firm* — Oblon, McClelland, Maier & Neustadt, L.L.P.

(57) ABSTRACT

A light source unit emits light for irradiating a document. A light guide in which light emitted from the light source unit propagates has a first exit part for emitting light to the document and a second exit part, which is a different part from the first light part, for emitting light to the outside. A corrective light receiver is disposed in an area receiving direct light of the light emitted from the second exit part, and outputs reference data corresponding to the direct light. A controller compares predetermined criterion data with the reference data output from the corrective light receiver, and performs processing for correcting a bright output based on a result of the comparison.

5 Claims, 18 Drawing Sheets

(51) Int. Cl.
*H04N 1/031* (2006.01)
*H04N 1/40* (2006.01)

(56) References Cited

FOREIGN PATENT DOCUMENTS

| JP | 6 54189 | 2/1994 |
|---|---|---|
| JP | 7 79341 | 3/1995 |
| JP | 2005 72696 | 3/2005 |
| JP | 2011 29033 | 2/2011 |
| JP | 2011 223389 | 11/2011 |
| JP | 2011 234019 | 11/2011 |
| TW | 201227014 A1 | 7/2012 |

OTHER PUBLICATIONS

Extended European Search Report issued Mar. 31, 2016 in Patent Application No. 13828729.7.

Japanese Office Acton issued Sep. 13, 2016, for Japanese Patent Application 2012-178137. Partial English translation provided.

* cited by examiner

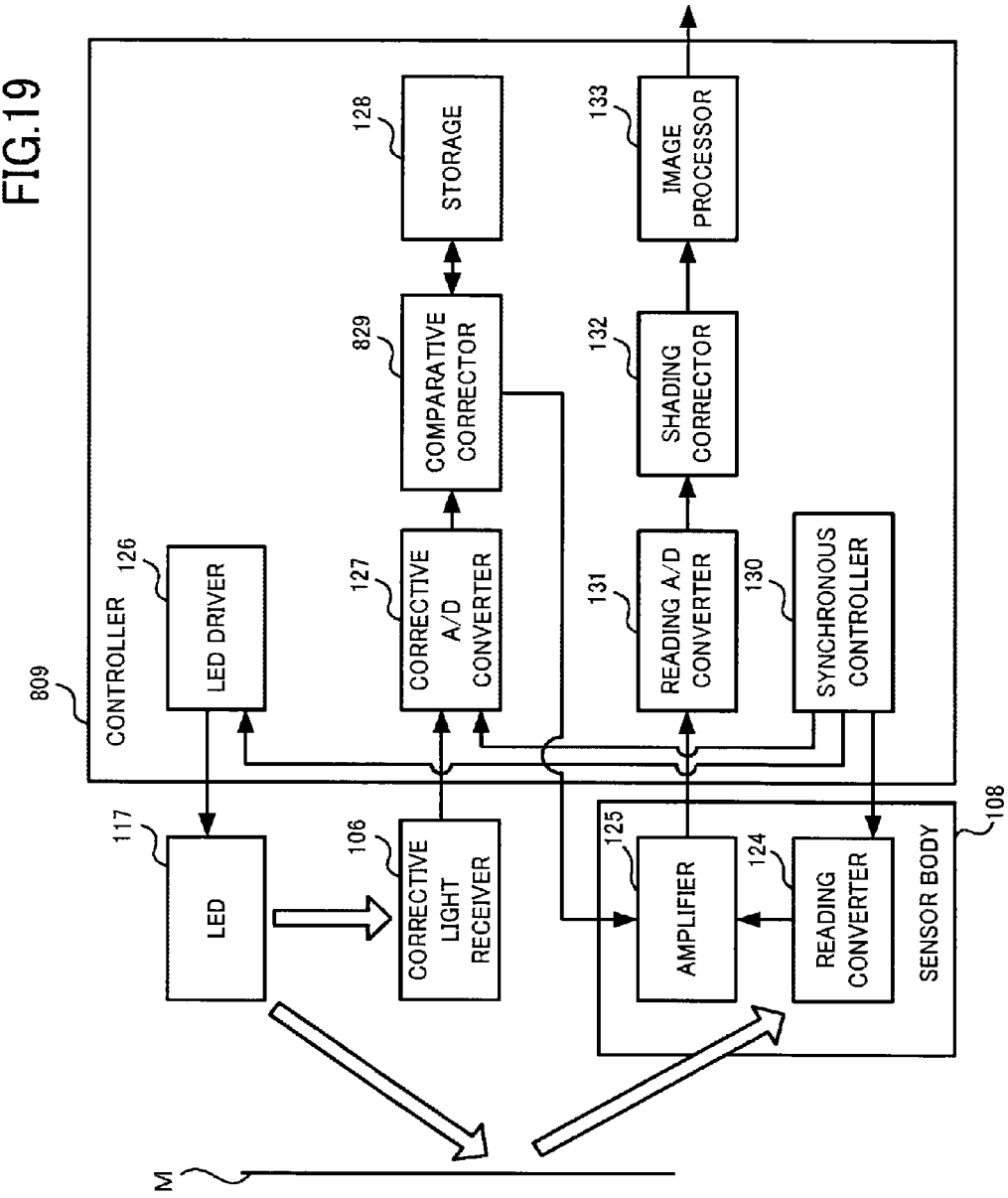

CONTACT IMAGE SENSOR, OUTPUT CORRECTION DEVICE FOR CONTACT IMAGE SENSOR, AND OUTPUT CORRECTION METHOD FOR CONTACT IMAGE SENSOR

TECHNICAL FIELD

The present disclosure relates to a contact image sensor, an output correction device for the contact image sensor, and an output correction method for the contact image sensor.

BACKGROUND ART

A contact image sensor reads an image represented on a document M by irradiating the document M with light from a light source and converting light reflected by the document M into an electrical signal with a light receiving element, and then outputs the result as image data.

The amount of light emitted from the light source can fluctuate depending on various factors. The amount of light from the light source can fluctuate depending on the environmental temperature, for example, due to the temperature characteristic of the light source. The amount of light from the light source can also fluctuate due to chronological factors of the order of a few seconds to a few hours for a shorter elapsed time period to of the order of a few days to a few years for a longer elapsed time period.

For stable reading of the image of the document M by a contact image sensor despite fluctuations in the amount of light from the light source, a bright output that is an output of the contact image sensor when the document M is white is corrected. For example, when the image data output from the light receiving element depending on light reflected by a platen roller described in Patent Literature 1 or a white reference tape described in Patent Literature 2 is given as reference data, the bright output can be corrected by comparing the reference data with predetermined criterion data.

CITATION LIST

Patent Literature

Patent Literature 1: Unexamined Japanese Patent Application Kokai Publication No. H6-54189.
Patent Literature 2: Unexamined Japanese Patent Application Kokai Publication No. H7-79341.

SUMMARY OF INVENTION

Technical Problem

However, when the output of the light receiving element depending on light reflected by the platen roller is used as reference data, as described in Cited Reference 1, the reference data cannot be acquired because the light receiving element cannot receive light reflected by the platen roller while the document M is positioned. Therefore, the bright output cannot be corrected while the document M is positioned. The amount of light from the light source can fluctuate in a short time due to the environmental temperature, chronological factors, and the like, which can lead to instability of the bright output.

In Cited Reference 2, the white reference tape is provided on the platen glass in an area where the document M does not pass. The white reference tape and the platen glass often have different coefficients of linear expansion. Therefore, when the output of the light receiving element depending on light reflected by the white reference tape is given as reference data, a fluctuation in the environmental temperature can degrade the accuracy of the reference data. In addition, the presence of the document M or the density of the image represented on the document M can affect the accuracy of the reference data adversely. The bright output cannot be corrected accurately with the inaccurate reference data, which results in instability of the bright output.

The present disclosure is made to solve the problems described above, and an objective of the present disclosure is to provide a contact image sensor that enables a stable bright output to be obtained, and the like.

Solution to Problem

To achieve the foregoing objective, the contact image sensor of the present disclosure includes a light source that emits light for irradiating a target to be read, a light guide in which light emitted from the light source propagates, the light guide having a first exit part for emitting the light to the target to be read and a second exit part, which is a different part from the first light part, for emitting light to the outside, a corrective light receiver that is disposed in an area receiving direct light of the light emitted from the second exit part and outputs reference data corresponding to the direct light, a reading light receiver that generates image data representing an image of the target to be read by photoelectrically converting the light emitted from the first exit part and reflected by the target to be read, and a corrector that compares predetermined criterion data with the reference data output from the corrective light receiver and, based on a result of the comparison, performs processing for correcting a bright output indicated by the image data generated by the reading light receiver when the target to be read is white.

Advantageous Effects of Invention

According to the present disclosure, the reference data for correcting the bright output corresponds to direct light of the light emitted from the light guide. Thus, the bright output can be corrected based on the reference data that accurately reflects the amount of light emitted from the light source. Therefore, the stable bright output can be obtained.

BRIEF DESCRIPTION OF DRAWINGS

FIG. 19 is a diagram illustrating the functional configuration of a controller according to an eighth embodiment of the present disclosure.

DESCRIPTION OF EMBODIMENTS

Figure 1:
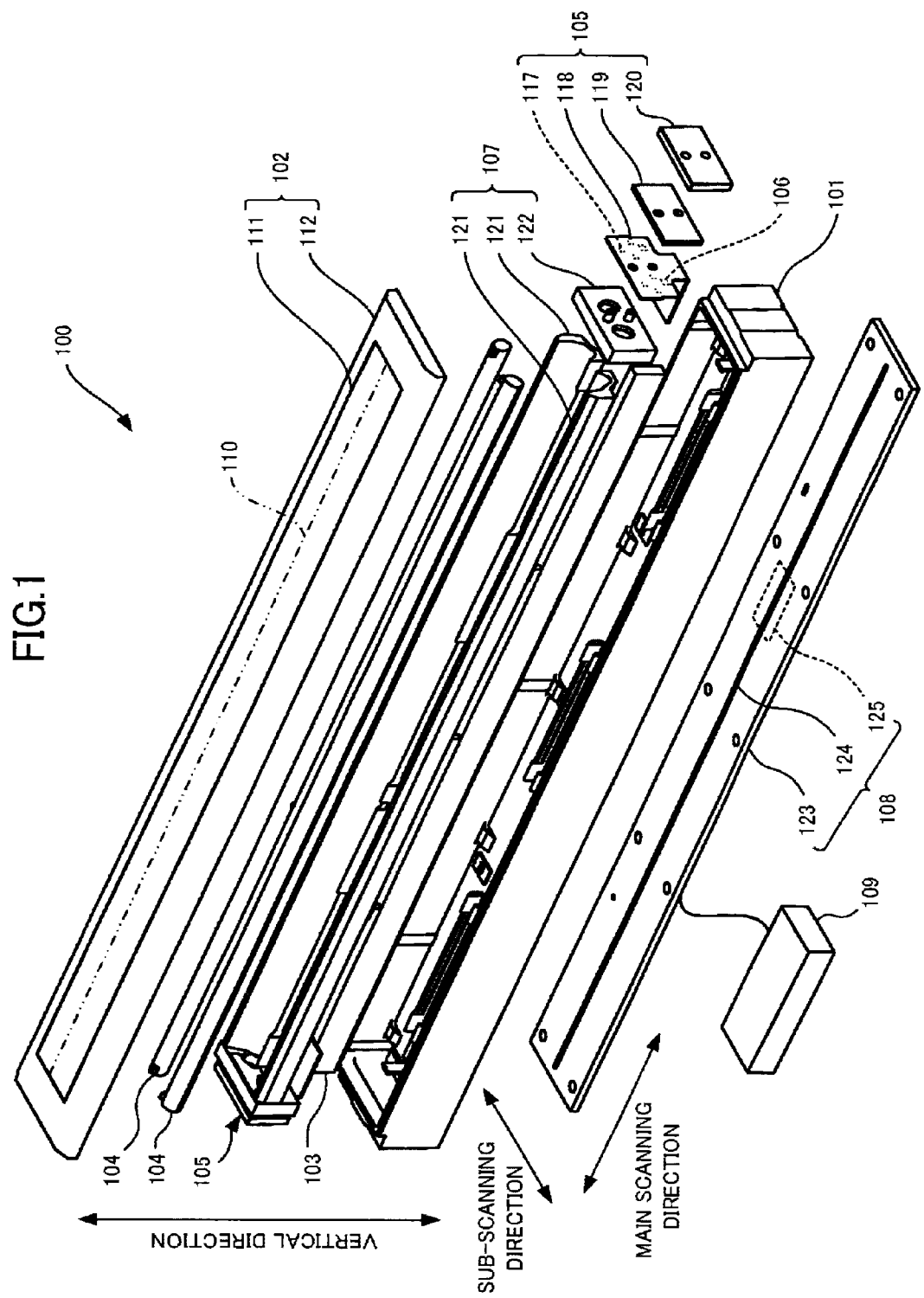
FIG. 1 is an exploded perspective view of a contact image sensor according to a first embodiment of the present disclosure.

Embodiments of the present disclosure are explained with reference to the drawings. The same reference numerals denote the same elements throughout the drawings.

First Embodiment

A contact image sensor according to a first embodiment of the present disclosure is a device for reading an image of a document M that is a target to be read, and is mounted, for example, to a facsimile machine, a copier, a scanner, a multifunctional device, a banking terminal, an industrial inspection device, and the like. The target to be read is not limited to the document M, and can be, for example, an optical mark recognition sheet, paper money, security documents including a check and any other documents, and the like.

The contact image sensor irradiates with light a reading part that is predetermined as a location where the document M is in close contact with the reading part and that extends linearly in a main scanning direction. Thus the document M that is in close contact with the reading part is irradiated with linear light. The contact image sensor receives light reflected by the document M, and then reads the image of the linear part of the document M irradiated with light.

The contact image sensor reads the image on the reading surface of the document M by sequentially reading the image of the linear part of the document M while the contact image sensor moves relatively to the document M in a sub-scanning direction. Here, the sub-scanning direction is a direction transverse to the main scanning direction and, in the present embodiment, a direction perpendicular to the main scanning direction.

The contact image sensor 100 includes a frame 101, a transmission body 102, a lens body 103, two light guides 104, four light source units 105, four corrective light receivers 106, a retainer 107, a sensor body 108, and a controller 109, as shown in the exploded perspective view of FIG. 1.

As shown therein, the frame 101 is a box-shaped member with an open top, configured to have a rectangular bottom having a longitudinal direction defined as the main scanning direction and a transverse direction defined as the sub-scanning direction and side walls extending upwards from the outer edges of the bottom. The frame 101 can be made, for example, of a black resin. The bottom of the frame 101 has an opening extending longitudinally at the middle in the transverse direction.

The transmission body 102 is mounted on the top of the frame 101 so as to close the upper side of the frame. The sensor body 108 is mounted to the outside of the bottom of the frame 101. The lens body 103, the light guides 104, the light source units 105, the corrective light receivers 106, and the retainer 107 are housed in a substantially closed space defined by the frame 101, the transmission body 102, and the lens body 103. In the present embodiment, the controller 109 is disposed at the lower side of the sensor body 108, but the controller 109 can be provided in any appropriate place.

The transmission body 102 is a member that transmits light with which the document M placed in close contact with the reading part 110 is irradiated and light reflected by the document M, and includes a transmissive section 111 and a retaining frame 112.

Figure 2:
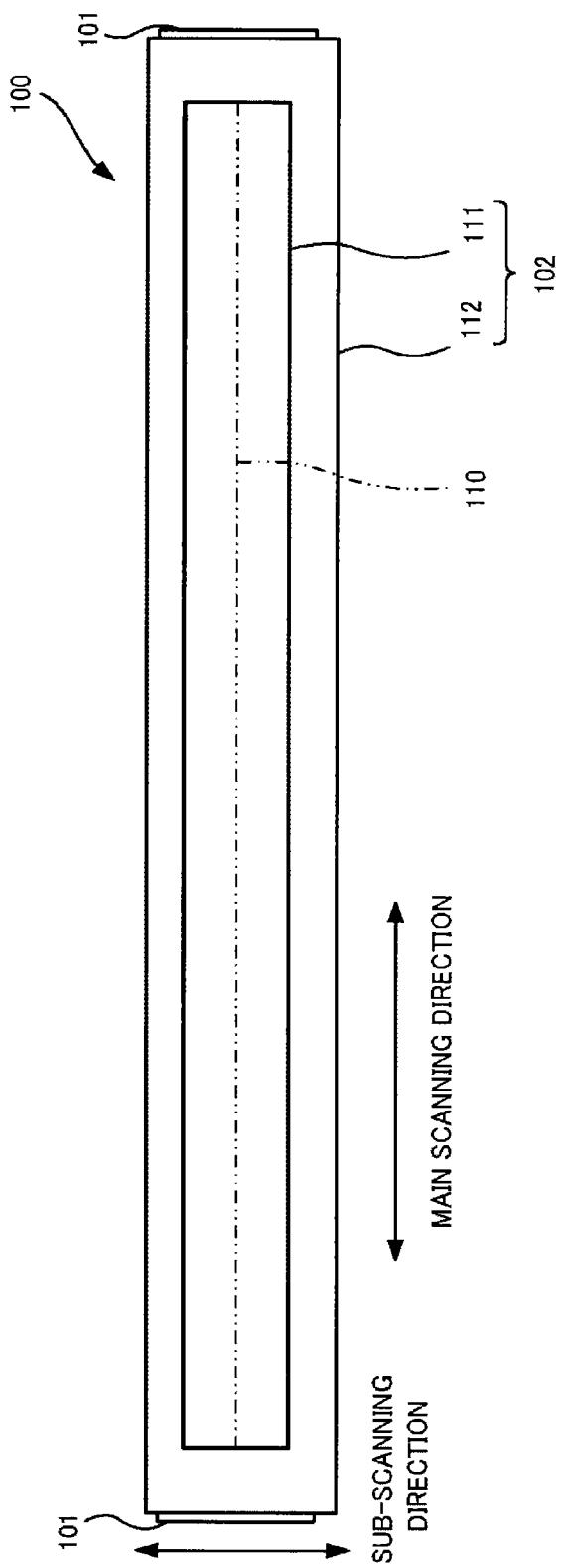
FIG. 2 is a plan view of the contact image sensor according to the first embodiment.

As shown in FIG. 2, which is a plan view of the contact image sensor 100, the transmissive section 111 has the linear reading part 110 extending in the main scanning direction on the external surface, and is a translucent, preferably, transparent flat plate made, for example, of a resin such as an acrylic or a polycarbonate, glass, and the like.

Figure 3:
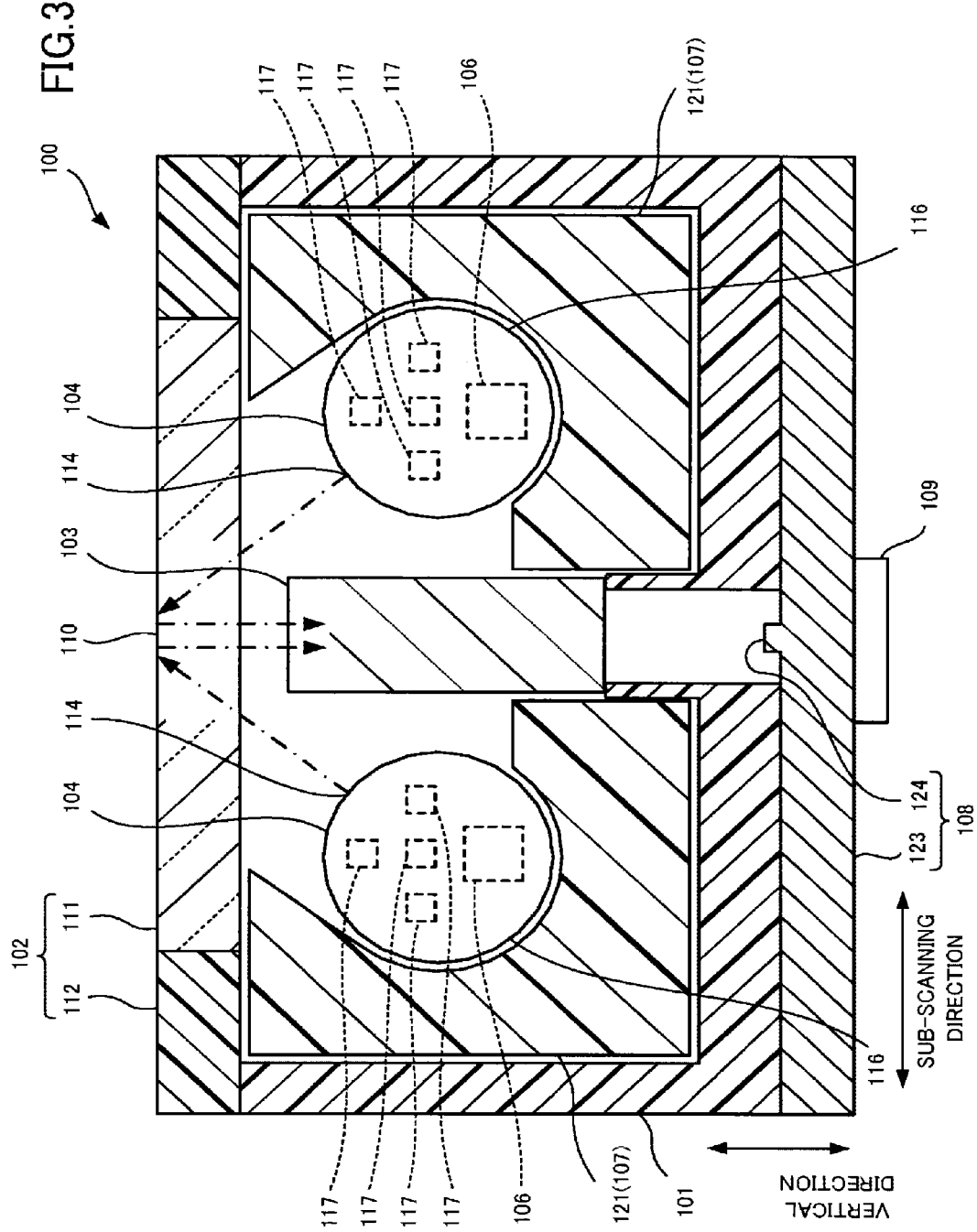
FIG. 3 is a sectional view of the contact image sensor according to the first embodiment as viewed in a main scanning direction.

The retaining frame 112 is a frame which surrounds the circumference of the transmissive section 111 and retains the transmissive section 111, and is made, for example, of a resin. The retaining frame 112 is mounted so that the outer edge is in close contact with the top of the frame 101, as shown in FIG. 3 which is a sectional view of the contact image sensor 100 as viewed in the main scanning direction, and FIG. 4 which is a sectional view of the contact image sensor 100 as viewed in the sub-scanning direction. This enables the retaining frame 112 to close the upper side of the frame 101 to prevent entry of dust particles and the like.

The lens body 103 is a member that focuses light reflected by the document M to the sensor body 108 and extends in the main scanning direction as shown in FIG. 1. The lens body 103 has a plurality of rod lenses arranged in the longitudinal direction. Each rod lens is placed above the opening disposed in the bottom of the frame 101 with the optical axis arranged vertically, as shown in FIG. 3.

Figure 4:
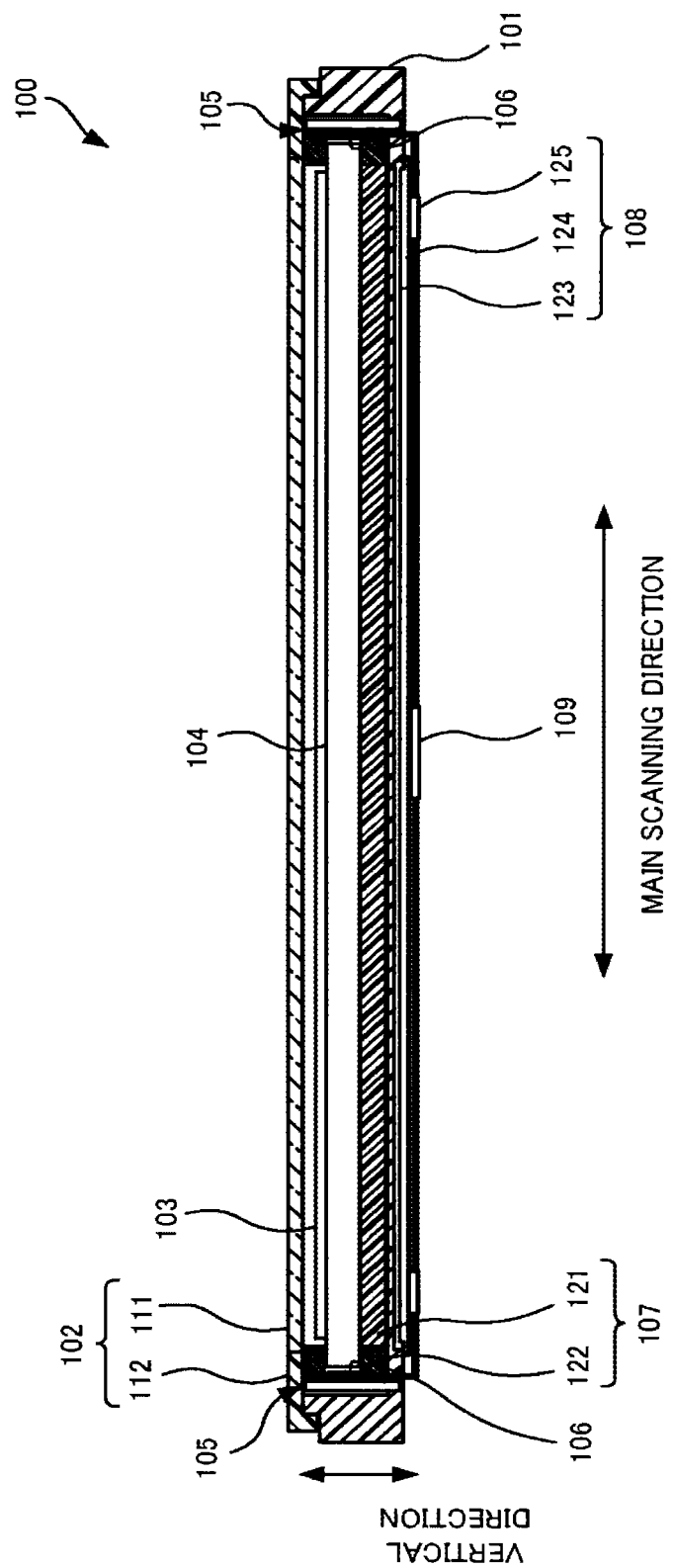
FIG. 4 is a sectional view of the contact image sensor according to the first embodiment as viewed in a sub-scanning direction.
Figure 5:
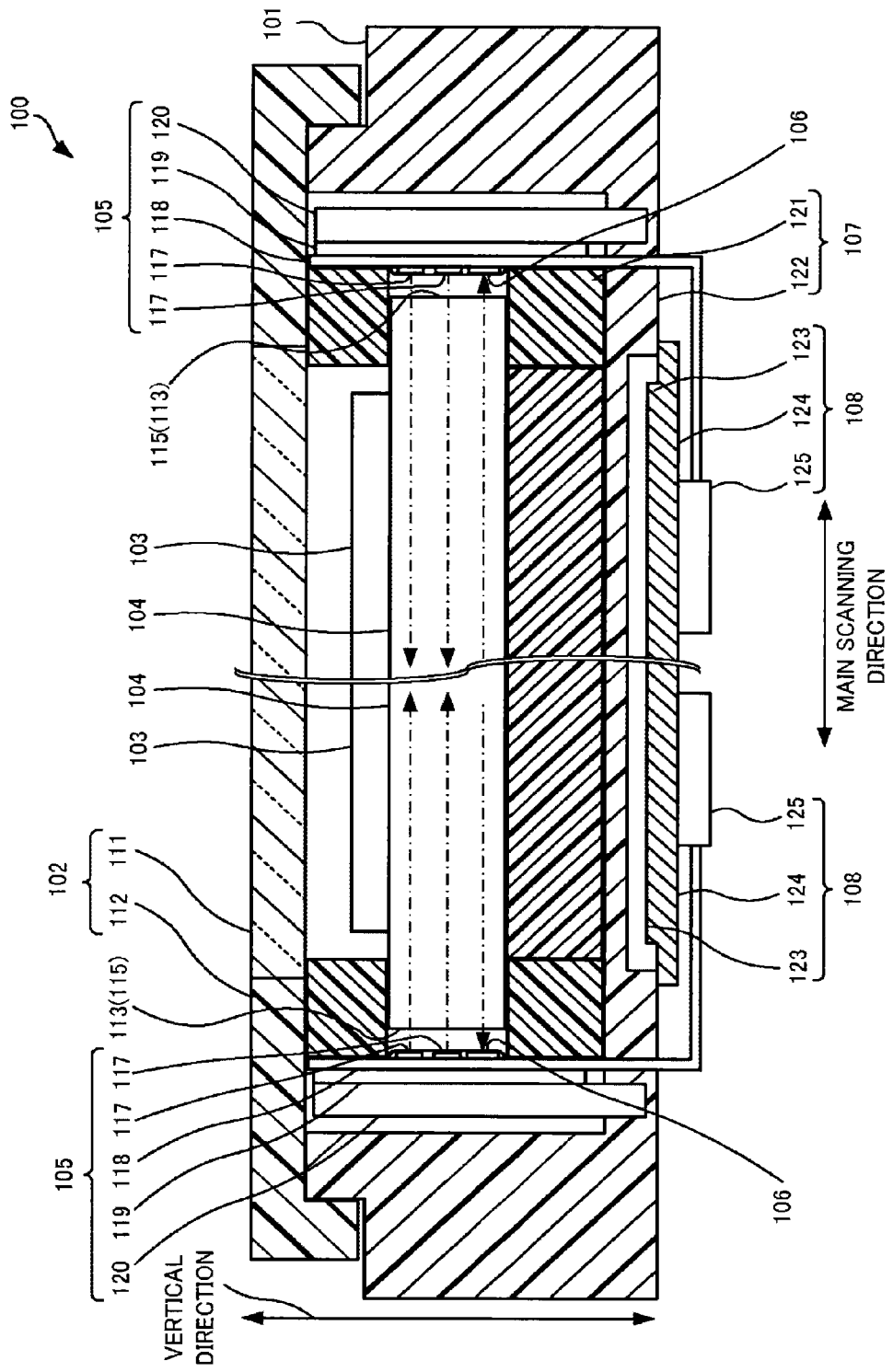
FIG. 5 is an enlarged view illustrating the vicinities of the ends of a light guide in FIG. 4.

Each of the light guides 104 is an elongated cylindrical member in which light entering into each of the light guides propagates in the longitudinal direction. Each of the light guides 104 has an entrance part 113, a first exit part 114, a second exit part 115, and a light diffusing layer 116, as shown in FIG. 5, which is an enlarged view of the vicinities of the ends of the light guide 104 in FIGS. 3 and 4.

The entrance part 113 is a part of the external surface of the light guide 104 and from which light emitted from the light source unit 105 enters the light guide. The first exit part 114 is a part of the external surface of the light guide 104, from which light is emitted toward the document M. The second exit part 115 is a part of the external surface of each of the light guides 104, from which light is emitted toward the corrective light receiver 106. The light diffusing layer 116 is a part that causes light propagating in the light guide 104 to be reflected and diffused, and can be formed such as by application of a light reflective material such as a white pigment, surface roughening of the light guide 104, serrated prism shaping, or pyramid shaped embossing.

In the present embodiment, the entrance part 113 and the second exit part 115 are formed in the respective ends of each of the light guides 104. The first exit part 114 and the light diffusing layer 116 are parts of the peripheral surface extending in the main scanning direction and are formed substantially symmetrically about the longitudinal axis of the light guide 104.

Each of the light source units 105 is a member that emits light for irradiating the document M, and includes four light emitting diode (LED) chips 117, an LED board 118, a thermally conductive sheet 119, and a heat sink 120.

Each of the LED chips 117 is a light source that emits visible light (red, blue, green, and yellow), ultraviolet light having a wavelength on the order of 365 nm, infrared light having a wavelength on the order of 700-1000 nm, and the like. The four LED chips 117 form one set, and light emitted from the one set of LED chips 117 enters from the entrance part 113 of the one light guide 104.

In the present embodiment, two light source units 105 share a single common LED board 118. This means that the eight LED chips 117 that serve as light sources for emitting light are mounted on the surface of the LED board 118. The LED chips 117 can be mounted directly on the LED board 118, or can be provided as a package with the LED chips mounted on the LED board 118.

The thermally conductive sheet 119 and the heat sink 120 are provided at the backside of the LED board 118. The thermally conductive sheet 119 and the heat sink 120 dissipate heat generated by the LED chips 117 to the outside, so that the LED chips 117 can emit light efficiently. For example, a ceramic board, an aluminum board, a rigid flexible board, or the like is preferably used as the LED board 118 to improve the heat dissipation efficiency.

Each of the corrective light receivers 106 is configured as a photodiode or the like having light receiving sensitivity to light emitted from the LED chips 117, and outputs an electrical signal depending on the amount of light received. One set of the LED chips 117 is provided in association with one corrective light receiver 106. Therefore, in the present embodiment, the two corrective light receivers 106 are mounted on the surface of the one LED board 118. The corrective light receivers 106 can be mounted directly on the LED board 118, or can be provided as a package with the corrective light receivers 106 together with the LED chips 117 mounted on the LED board 118.

The retainer 107 is a member for securing, in the frame 101, the two light guides 104 and the light source units 105 provided with the corrective light receivers 106, and includes two supports 121 and two holders 122.

Each of the two supports 121 supports the one light guide 104 with the longitudinal direction oriented to the main scanning direction, and is provided so that the support covers the peripheral surface of the light guide 104 except the first exit part 114.

Each of the holders 122 has two holes into which the ends of the light guides 104 fit. A projection is provided on the peripheral surface near each end of each light guide 104, and upon fitting of each end into the hole of the holder 122, each projection engages into the hole. This restrains movement of each light guide 104 in the main scanning direction and rotation around the longitudinal axis of the light guide 104, in the frame 101.

The two light guides 104 and the retainer 107 are secured in the frame 101 so that the supports 121 support the respective light guides 104, the ends on the one side of the two light guides 104 are fitted into the respective holes in the one holder 122, and the ends on the other side of the two light guides 104 are fitted into the respective holes in the other holder 122. The two light guides 104 are secured in the frame 101 in parallel to each other with the longitudinal direction oriented to the main scanning direction by the retainer 107, and are placed symmetrically with respect to the lens body 103. In addition, as shown in FIG. 3, each of the light guides 104 is placed so that light propagating in the light guide and reflected and diffused by the light diffusing layer 116 is emitted from the first exit part 114 to the reading part 110, that is, toward the document M. Note that the light diffusing layer 116 can be formed on each support 121 instead of or together with each light guide 104.

As shown in FIG. 5, the LED boards 118 are mounted to the respective holders 122 so that the surfaces face the ends of the light guides 104. By this, the set of the four LED chips 117 and the one corrective light receiver 106 are positioned facing all the respective ends of the two light guides 104.

The positional relationship between the respective ends on the one side of the light guides 104 and the sets of the LED chips 117 and the corrective light receivers 106 is explained with reference to FIG. 3.

As shown therein, as viewed in the main scanning direction, one of the LED chips 117 is positioned in the center of the light guide 104, and the other three LED chips 117 are each positioned equidistant from the center in the up, left, and right directions. The corrective light receiver 106 is positioned apart from the transmissive section 111, that is, below the center of the light guide 104 so that the corrective light receiver is unlikely to receive light entering the contact image sensor 100 from the outside via the transmissive section 111 described in detail below.

The sensor body (reading light receiver) 108 receives light reflected by the document M via the lens body 103, generates image data representing the read image by photoelectric conversion or the like, and then outputs the image data. The image data handled by the sensor body 108 is analog data and thus hereinafter referred to as analog image data. The sensor body 108 includes a sensor board 123, a plurality of reading converters 124, and amplifiers 125, as shown in FIGS. 3 and 4.

The sensor board 123 is a rectangular board having substantially the same size as the bottom of the frame 101, and the upper surface of the sensor board is positioned facing the external surface of the bottom of the frame 101 and is secured to the frame 101, for example, by means of screwing.

The reading converters 124 are configured to have a plurality of photodiodes, capacitors, and the like, and have light receiving sensitivity to light emitted from the LED chips 117. The reading converters 124 each generate an electrical signal depending on the received light, and then output the electric signal as analog image data acquired by photoelectric conversion. Specifically, the reading converter 124 produces photovoltaic power in response to the received light, and then generates an electrical signal depending on the received light by photoelectric conversion of light energy into an electrical signal.

The reading converters 124 are arranged on the upper surface of the sensor board 123 in the main scanning direction, and when the sensor board 123 is fixed to the frame 101, are positioned in or below the opening at the bottom of the frame 101.

The amplifier 125 is configured, for example, as a circuit disposed on the sensor board 123, and amplifies the electrical signal generated by the reading converters 124 and then outputs the amplified electrical signal. The amplifier 125 outputs the generated electrical signal as amplified analog image data.

The controller 109 performs correction processing of the bright output, output processing of the image data representing the document M, and the like by transmitting and receiving various signals (data) to and from the reading converters 124, the light source units 105, and the corrective light receivers 106. The image data output from the controller 109 is digital data. The image data that is digital data is hereinafter referred to as digital image data.

Here, the bright output is contents (such as each pixel value) indicated by image data that is generated by the contact image sensor 100 when a white target to be read is read. Specifically, the bright output is the contents indicated by the image data that is generated by the reading part 110 when the target to be read is white.

Figure 6:
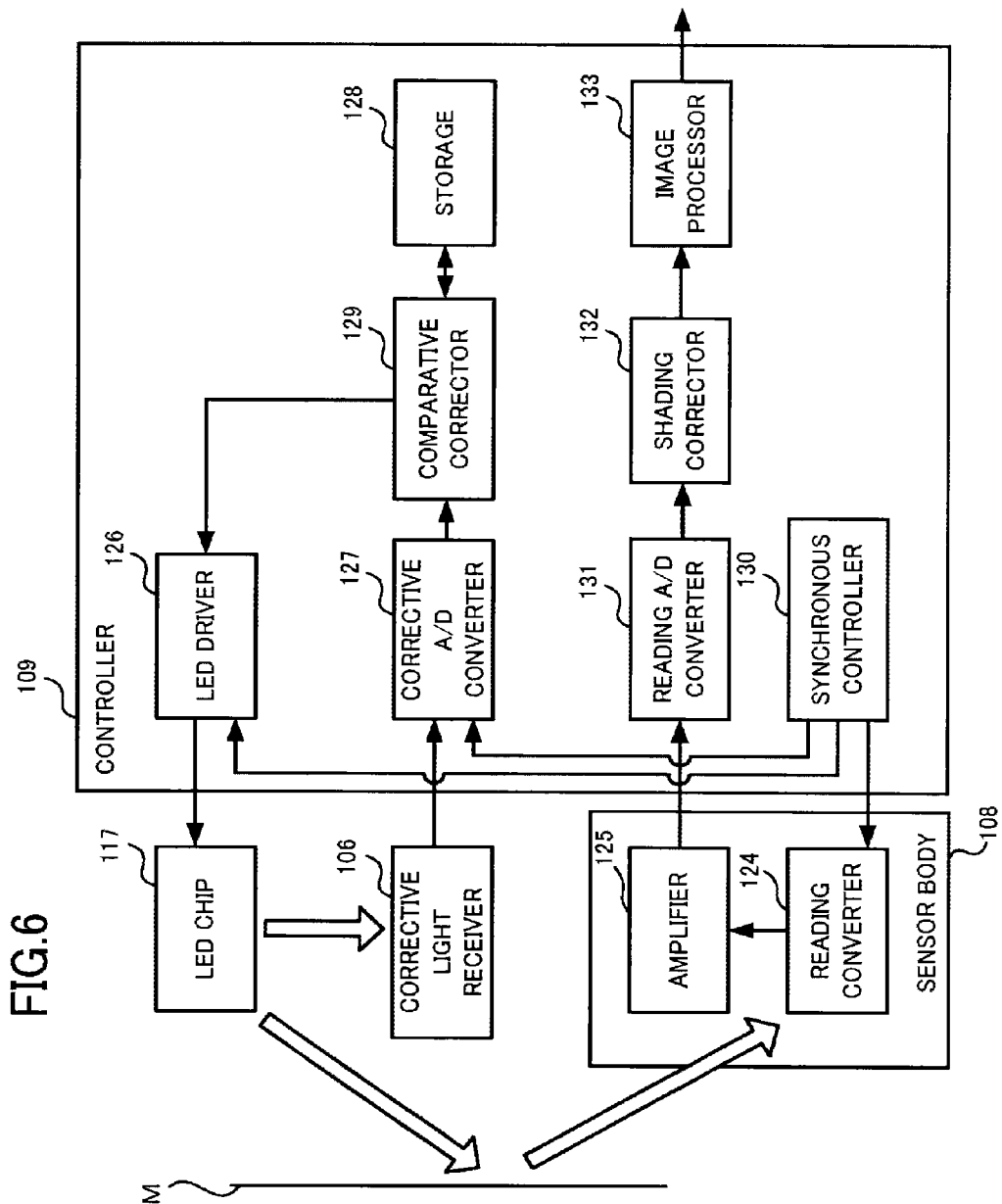
FIG. 6 is a diagram illustrating the functional configuration of a controller according to the first embodiment.

The controller 109 is configured to have an electrical circuit, a microcomputer, a flash memory, and the like, or any combination thereof. As shown in FIG. 6, the controller 109 functionally includes an LED driver 126, a corrective A/D (Analog/Digital) converter 127, a storage 128, a comparative corrector (corrector) 129, a synchronous controller 130, a reading A/D converter 131, a shading corrector 132, and an image processor 133.

The LED driver 126 controls the amount of light by controlling, for example, the magnitude of current applied to the LED chips 117, the length of time for which current is applied to the LED chips 117, and the like, while causing the LED chips 117 to emit light.

The corrective A/D converter 127 converts an electrical signal that is analog data output from the corrective light receiver 106 into reference data that is digital data.

The storage 128 stores criterion data indicating a criterion of the bright output. The criterion data is stored in the storage 128, for example, upon shipping of the contact image sensor 100, initial operation of the contact image sensor 100, or the like. An example of data to be set as the criterion data is amount of light from the LED chips 117 received by the corrective light receivers 106 at a timing of storing as stated above.

The comparative corrector 129 compares the reference data generated by the corrective A/D converter 127 with the criterion data in the storage 128. Then, the comparative corrector 129 causes the LED driver 126 to change the length of time for which current is applied to the LED chips 117, the magnitude of the current, and/or the like so that the content of the reference data meets the criterion indicated by the criterion data. This changes the amount of light emitted by the LED chips 117, thereby correcting the bright output. Specifically, for example, the bright output is corrected so that each value indicated by the reference data is equal to the value indicated by the criterion data.

Note that the comparative corrector 129 can correct the bright output based on the reference data that is analog data and the criterion data associated therewith.

The synchronous controller 130 outputs a synchronization signal for synchronizing light emission of the LED chips 117 with one or both of photoelectric conversion of the reading converters 124 and A/D conversion of the corrective A/D converter 127 to the LED driver 126 and one or both of the reading converters 124 and the corrective A/D converter 127. The reading A/D converter 131 generates digital image data by converting the analog image data amplified by the amplifier 125 of the sensor body 108 into digital data. The shading corrector 132 generates shading-corrected digital image data by acquiring the digital image data from the reading A/D converter 131 and then performing shading correction. The image processor 133 acquires the digital image data shading corrected by the shading corrector 132 and generates image data by performing predetermined image processing, and then outputs the image data.

For example, when the contact image sensor 100 is applied to an industrial inspection device, the image processor 133 can determine whether the target to be read meets the inspection criteria by collating the generated image data with the pre-stored determination data. Here, the determination data indicates a criterion for determining whether the target to be read meets the inspection criteria. Then, the image processor 133 can output data that indicates the determination result.

As a further example, when the contact image sensor 100 is applied to a reading device for an optical mark recognition sheet, the image processor 133 can identify selected marks on the optical mark recognition sheet, and then output data indicative of the identified result. Specifically, the image processor 133 identifies the selected marks on the optical mark recognition sheet by locating the selected marks on the optical mark recognition sheet from the generated image data and then collating the locations of the marks with pre-stored identification data, for example. Here, the identification data indicates, for example, a location represented by each of the marks (numerals, alphabets, symbols, and the like) on the optical mark recognition sheet.

The configuration of the contact image sensor 100 according to the first embodiment of the present disclosure has been explained. The operation of the contact image sensor 100 is explained with reference to the drawings hereafter.

Figure 7:
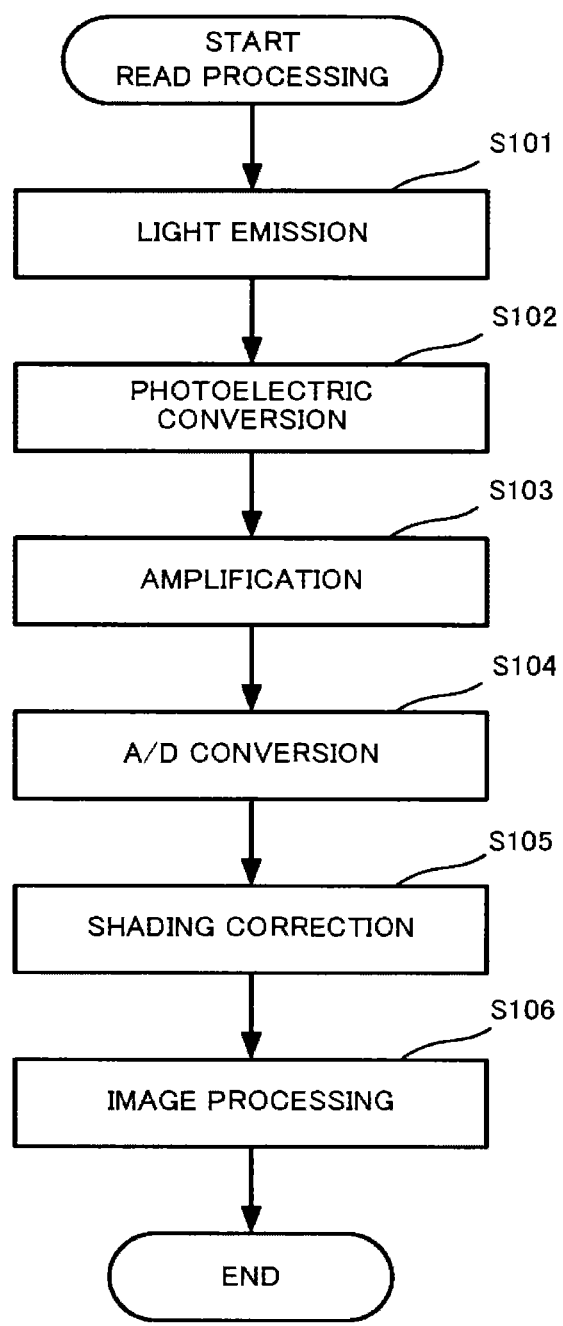
FIG. 7 is a flow chart illustrating a flow of read processing according to the first embodiment.

The contact image sensor 100 performs general read processing, as shown in FIG. 7, in response to reading synchronization signal from the synchronous controller 130 with the document M in close contact with the reading part 110. The contact image sensor 100 performs read processing repeatedly while moving relatively to the document M in the sub-scanning direction with the document M in close contact with the reading part 110, thereby reading the image of the reading surface of the document M and then generating and outputting image data representing the image.

As shown therein, the LED driver 126 causes the LED chips 117 to emit light upon receiving the reading synchronization signal from the synchronous controller 130 (step S101). The LED driver 126 then controls the amount of light emitted from the LED chips 117 by controlling the magnitude of current applied to the LED chips 117, the length of time for which current is applied to the LED chips 117, and the like to be a predetermined magnitude, length, and the like, respectively.

Light emitted from the LED chips 117 enters the light guides 104 from the end of the light guides 104 facing the LED chips 117. Light entering the light guides 104 propagates in the light guides 104 in the main scanning direction while totally reflecting. The light scattered and reflected on the light diffusing layer 116, which is a part of the light propagating in the light guides 104, is emitted from the first exit part 114.

Here, the supports 121 of the retainer 107 are, as described above, provided so as to cover the peripheral surfaces except the first exit parts 114 of the light guides 104. The light not totally reflected in the light guides 104 leaks from the peripheral surface except the first exit part 114 to the outside of the light guides 104 and is reflected by the supports 121. Therefore, the supports 121 covering the peripheral surfaces except the first exit parts 114 of the light guides 104 can improve extraction efficiency of light emitted to the document M that is the target to be read.

The document M that is in close contact with the reading part 110 is irradiated via the transmissive section 111 with the light emitted from the first exit part 114, and then the light is reflected by the document M. The light reflected by the document M passes through the lens body 103 via the transmissive section 111. The light passing through the lens body 103 converges to each light receiver of the reading converters 124 and is then received by the light receiver.

Each of the reading converters 124 performs photoelectric conversion for generating an electrical signal depending on the received light (step S102). Each of the reading converters 124 outputs analog image data acquired by the photoelectric conversion. Here, the analog image data output from the reading converters 124 included in the sensor body 108 represents the image of the linear part of the document M that is in close contact with the reading part 110.

The amplifier 125 amplifies the electrical signal output from each of the reading converters 124, that is, the analog image data acquired by the photoelectric conversion (step S103). The amplifier 125 outputs the amplified analog image data.

The reading A/D converter 131 converts the amplified analog image data into digital image data (step S104). The reading A/D converter 131 then outputs the digital image data acquired by the conversion.

The shading corrector 132 applies predetermined shading correction processing to the digital image data output from the reading A/D converter 131 (step S105). The shading corrector 132 outputs the digital image data that has been shading corrected.

The image processor 133 performs predetermined image processing on the digital image data that has been shading corrected by the shading corrector 132 (steps S106). The image processor 133 then outputs the digital image data that has processed with the image processing. The image processor 133 completes the read processing.

The application of such read processing sequentially generates read data, digitally converted data, shading corrected data, and image data, all of which represent the image of the linear part of the document M that is in close contact with the reading part 110. The contact image sensor 100 performs read processing repeatedly while moving relatively to the document M in the sub-scanning direction with the document M in close contact with the reading part 110, and thus acquires image data representing image of the reading surface of the document M.

Figure 8:
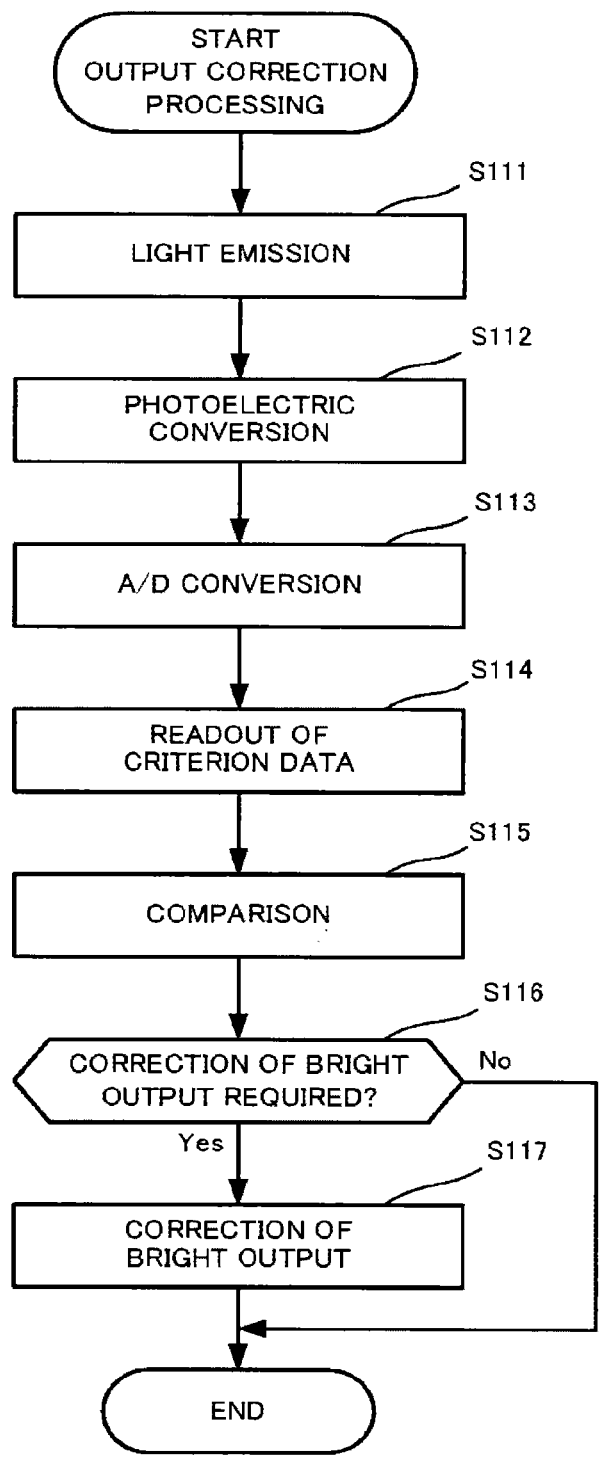
FIG. 8 is a flow chart illustrating a flow of output correction processing according to the first embodiment.

The contact image sensor 100 performs output correction processing as shown in FIG. 8. The output correction processing is processing for correcting the bright output and is performed in response to the output correcting synchronization signal from the synchronous controller 130. The output correcting synchronization signal can be, for example, common to the reading synchronization signal as stated above, can be output upon startup of the contact image sensor 100, or can be output in response to operation applied to an operation unit not shown.

As shown therein, the LED driver 126 causes the LED chips 117 to emit light upon receiving the output correcting synchronization signal from the synchronous controller 130 (step S111). As with the light emission processing in step S101, the LED driver 126 then controls the amount of light emitted from the LED chips 117.

Note that when the output correcting synchronization signal and the reading synchronization signal are common, step S111 and step S101 are the same processing.

The light emitted from the LED chips 117 positioned facing one end of the respective light guides 104 propagates in the light guides 104, and then is received by the corrective light receiver 106 positioned facing the other ends of the light guides 104. The corrective light receiver 106 performs photoelectric conversion for generating an electrical signal corresponding to the received light (step S112). The corrective light receiver 106 then outputs an electrical signal that is analog data generated by the photoelectric conversion.

Upon receiving of a synchronization signal from the synchronous controller 130, the corrective A/D converter 127 then generates reference data by A/D converting the electrical signal that is analog data acquired from the corrective light receiver 106 (step S113). The reference data is digital data indicative of the amount of light received from the LED chips 117 by the corrective light receiver 106 upon receiving of the synchronization signal from the synchronous controller 130.

The comparative corrector 129 acquires reference data from the corrective A/D converter 127 and reads criterion data from the storage 128 (step S114).

The comparative corrector 129 compares the reference data with the criterion data (step S115).

The comparative corrector 129 determines whether the bright output is required to be corrected or not, based on the comparison result (step S116). For example, when the reference data and the criterion data each indicate the same value, the comparative corrector 129 determines that the bright output is not required to be corrected (step S116; No), and then ends the output correction processing.

For example, when the reference data and the criterion data each indicate the different values, the comparative corrector 129 determines that the bright output is required to be corrected (step S116; Yes).

The comparative corrector 129 controls the LED driver 126 so that the reference data and the criterion data each indicate the same value. Specifically, the comparative corrector 129 adjusts the amount of light from the LED chips 117 by causing the LED driver 126 to change the magnitude of current applied to the LED chips 117 and the length of time for which current is applied to the LED chips 117. The comparative corrector 129 thereby corrects the bright output (step S117), and then ends the output correction processing.

In the present embodiment, the corrective light receiver 106 directly receives light that has propagated in the light guides 104. The bright output is then corrected based on the reference data corresponding to direct light received by the corrective light receiver 106. The output correction processing can be thus performed at any time, for example, depending on light emitted during read processing with or without the document M. Therefore, the bright output can be corrected even when the amount of light from the LED chips 117 varies due to not only long term degradation of the LED chips 117 but also due to environmental temperatures, short-term chronological factors, and the like. This thus enables obtaining stable bright output.

In addition, the corrective light receivers 106 receives direct light that has propagated in the light guides 104, and does not receive indirect light emitted from the light guides 104 and reflected by members such as a platen roller, a white reference tape, and the like. The reference data that accurately reflects the amount of light emitted from the LED chips 117 can be thus acquired without the influence of degradation of intervening members, dirt, and the like. This thus enables obtaining stable bright output.

In addition, the image data output from the sensor body 108 can transiently vary during the warm-up time after power-up. In the present embodiment, the bright output is not substantially affected by transient variations of the image data output from the sensor body 108 because the bright output is corrected based on the reference data corresponding to direct light received by the corrective light receiver 106. Therefore, even during the warm-up time after power-up, the bright output can be corrected and the stable bright output can be obtained.

Acquisition of the stable bright output can improve either one of the quality of the read image, determination accuracy in inspection, identification accuracy of selected marks on an optical mark recognition sheet, and the like, that is suitable for the application of the device to which the contact image sensor 100 is implemented.

In addition, the corrective light receiver 106 is not irradiated directly by external light transmitted through the transmission body 102 or light reflected by the document M, and the external light or the reflected light is required to pass at least through the light guides 104 before being received by the corrective light receiver 106. Therefore, the influence on light received by the corrective light receiver 106 due to the external light or the reflected light can be reduced. This can improve the accuracy of the reference data, which enables obtaining the stable bright output.

With the LED chips 117 emitting ultraviolet light, for example, acquisition of the reference data itself can be difficult when the reference data is acquired upon receiving of light reflected by a platen roller, a white reference tape, or the like. Moreover, even when the reference data can be acquired, degradation over time can be significant and this can result in poorer accuracy. According to the present embodiment, the corrective light receiver 106 directly receives light that has propagated in the light guide 104. Use of the corrective light receiver 106 having a sensitivity to ultraviolet light thus enables accurate reference output of ultraviolet light to be obtained even with the LED chips 117 emitting ultraviolet light. Therefore, the stable bright output can be obtained even with ultraviolet light. Similarly, the stable bright output can be obtained even with infrared light.

In the present embodiment, the bright output can be corrected by causing the LED driver 126 to control the amount of light emitted by the LED chips 117. The LED driver 126 is provided in a typical contact image sensor 100. Therefore, an increase in the number of parts for correcting the bright output can be mitigated and the stable bright output can be obtained with a simple configuration.

Second Embodiment

A contact image sensor according to the present embodiment differs from the contact image sensor 100 according to the first embodiment in arrangement of light source units and corrective light receivers.

Figure 9:
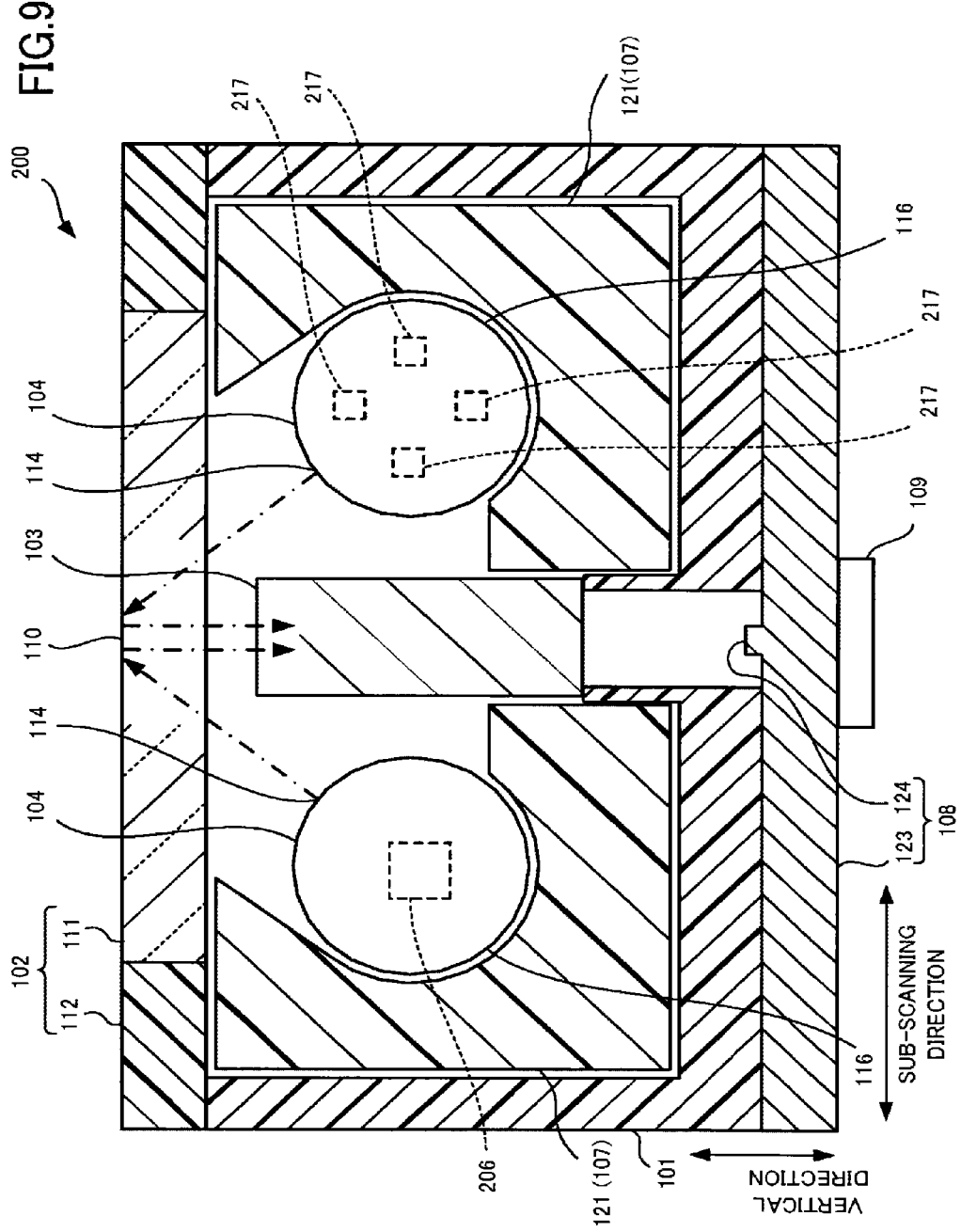
FIG. 9 is a sectional view of a contact image sensor according to a second embodiment of the present disclosure as viewed in a main scanning direction.
Figure 10:
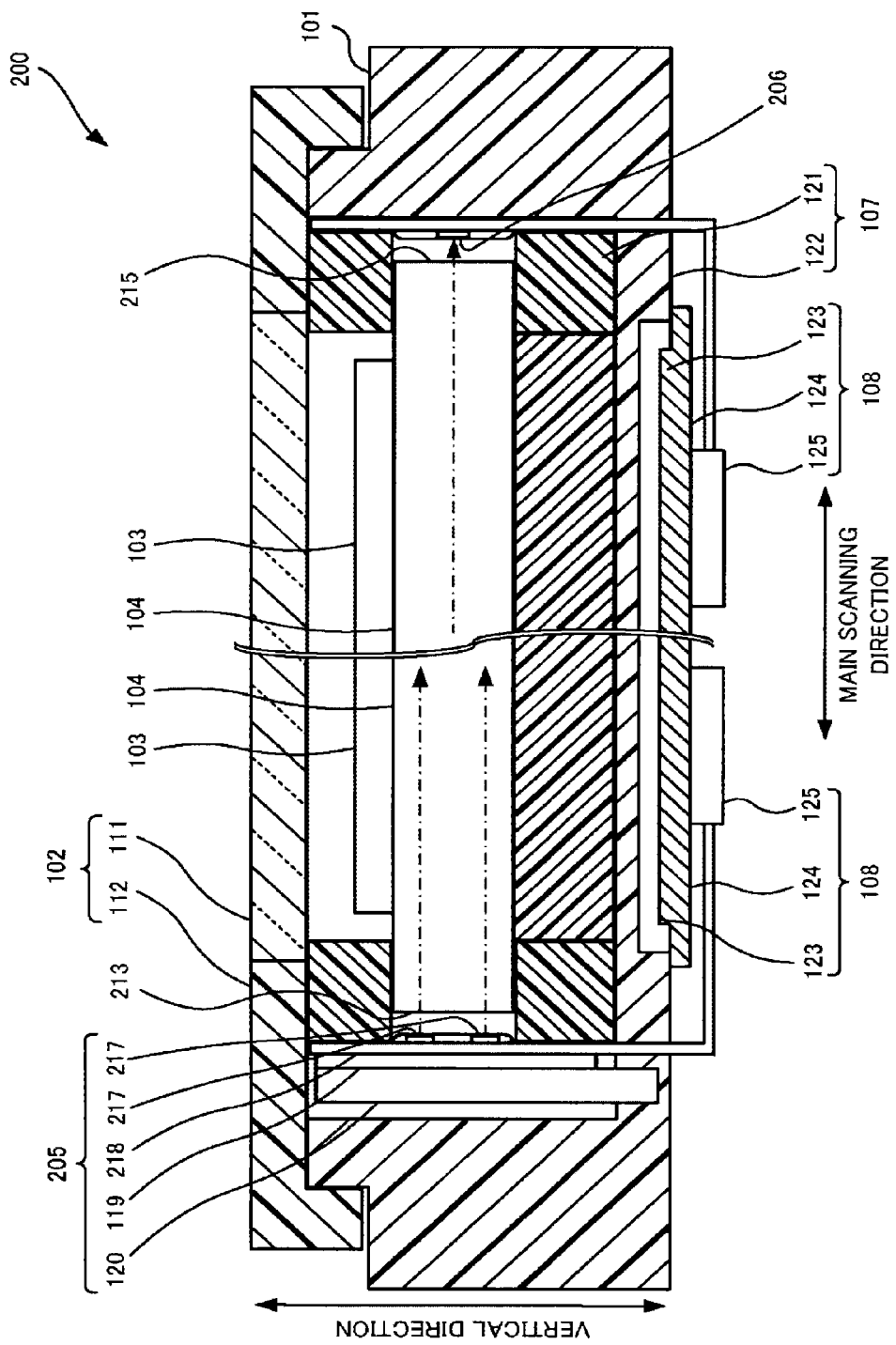
FIG. 10 is a sectional view of the contact image sensor according to the second embodiment as viewed in a sub-scanning direction, illustrating an enlarged view of the vicinities of the ends of a light guide.
Figure 11:
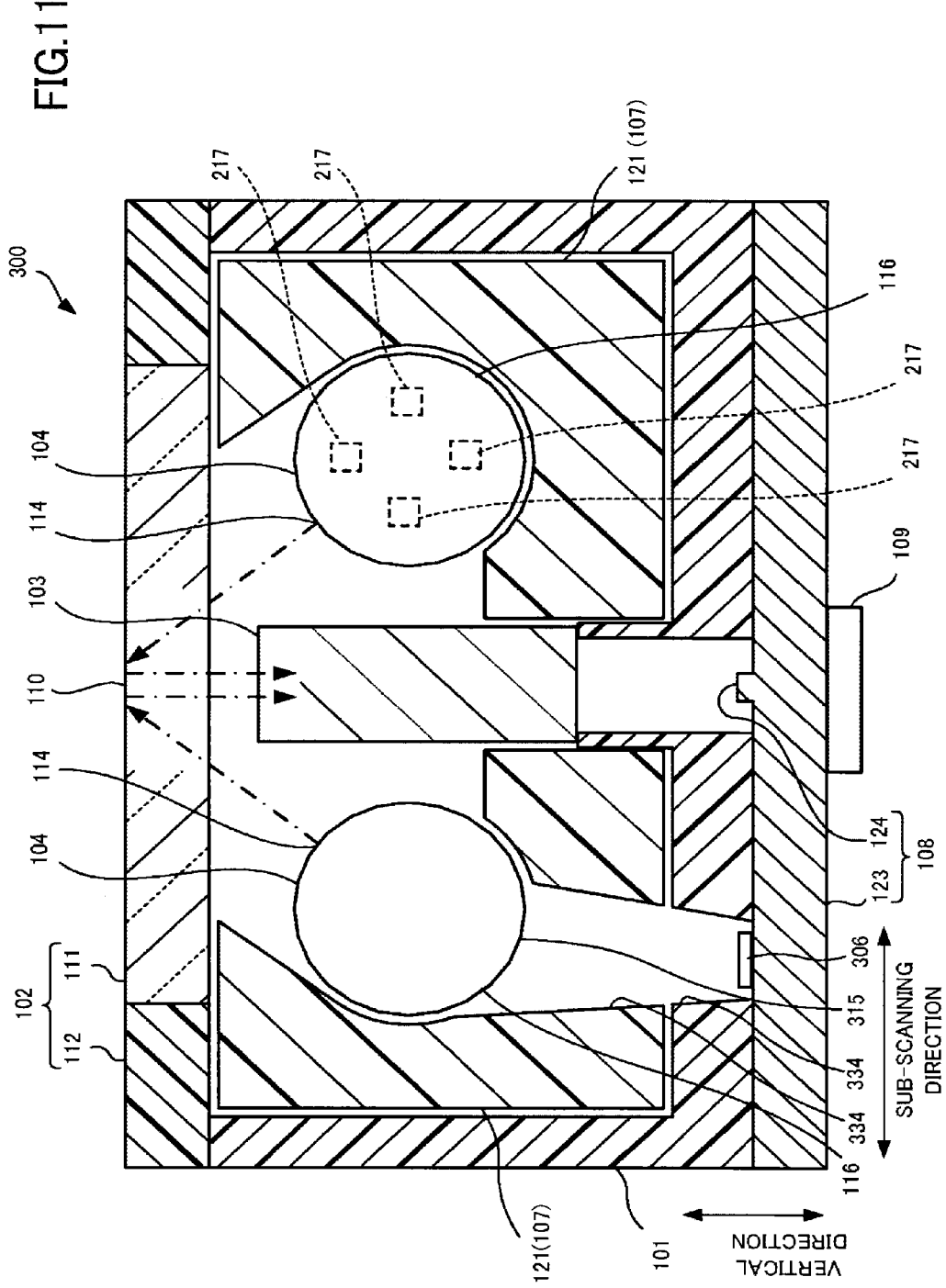
FIG. 11 is a sectional view of a contact image sensor according to a third embodiment of the present disclosure as viewed in a main scanning direction.

The contact image sensor 200 according to the present embodiment includes light source units 205 and corrective light receivers 206 that are respectively positioned facing one end and the other end of the respective light guides 104, as shown in FIG. 9, which is a sectional view as viewed in the main scanning direction, and FIG. 10, which is a sectional view as viewed in the sub-scanning direction. The light source unit 205 includes four LED chips 217 disposed on an LED board, as shown in FIG. 11 as viewed in the main scanning direction, and the LED chips 217 are each positioned facing the one end of the light guide 104 at equidistant positions from the center of the one end of the light guide 104 in the up, down, left, and right directions.

The contact image sensor 200 according to the present embodiment operates similarly as in the first embodiment. As shown in FIGS. 9 and 10, light emitted from the light source unit 205 thus enters from the one end (entrance part 213) of the light guide 104 and then propagates in the light guide 104. A part of the light propagating in the light guide 104 is emitted from the other end (second exit part 215) of the light guide 104 and is received directly by the corrective light receiver 206. Then, the corrective light receiver 206 generates an electrical signal corresponding to the received light, and then corrects bright output based on reference data generated from the electrical signal. Therefore, the stable bright output can be obtained as in the first embodiment.

In the present embodiment, LED board 218 with the LED chips 217 is positioned at the one end of each light guide 104, and corrective light receivers 206 is positioned at the other end, for example, with the corrective light receiver 206 mounted on a board. The corrective light receiver 206 generates relatively less heat, so that no thermally conductive sheet 119 or heat sink 120 is required to be provided on the corrective light receiver 206. This thus enables the reduced number of parts constituting the contact image sensor 200 and the more compact contact image sensor 200.

Third Embodiment

A contact image sensor according to the present embodiment differs from the contact image sensor 200 according to the second embodiment in arrangement of corrective light receivers.

In the contact image sensor 300 according to the present embodiment, LED chips 217 of light source units 205 similar to the second embodiment are positioned at the one end of each of the light guides 104, as shown in FIG. 11. Also, a support 121 and a frame 101 are provided with a hole 334 extending therethrough downwardly from a second exit part 315 formed on the peripheral surface near the other end of each of the light guides 104 to the upper surface of a sensor board 123.

The contact image sensor 300 according to the present embodiment operates similarly as in the first embodiment. Light emitted from the light source unit 205 thus enters from the one end (entrance part) of the light guide 104 and then propagates in the light guide 104, as in the second embodiment. A part of the light propagating in the light guide 104 is emitted downwardly from a part (second exit part 315) of the peripheral surface near the other ends of the light guides 104 and is received directly by the corrective light receiver 306. Then, the corrective light receiver 306 generates an electrical signal corresponding to the received light, and then corrects bright output based on reference data generated from the electrical signal. Therefore, the stable bright output can be obtained as in the first embodiment.

In the present embodiment, the corrective light receiver 306 is provided near the each end of the each light guide 104, but the corrective light receiver 306 has a larger distance from the transmission body 102 than the corrective light receiver 106 according to the first embodiment. Therefore, the influence on light received by the corrective light receiver 306 due to the external light or the light reflected by the document M can be further reduced. This can improve the accuracy of the reference data, which enables the stable bright output to be obtained.

Fourth Embodiment

A contact image sensor according to the present embodiment differs from the contact image sensor 100 according to the first embodiment in shape of light guides and arrangement of corrective light receivers.

Figure 12:
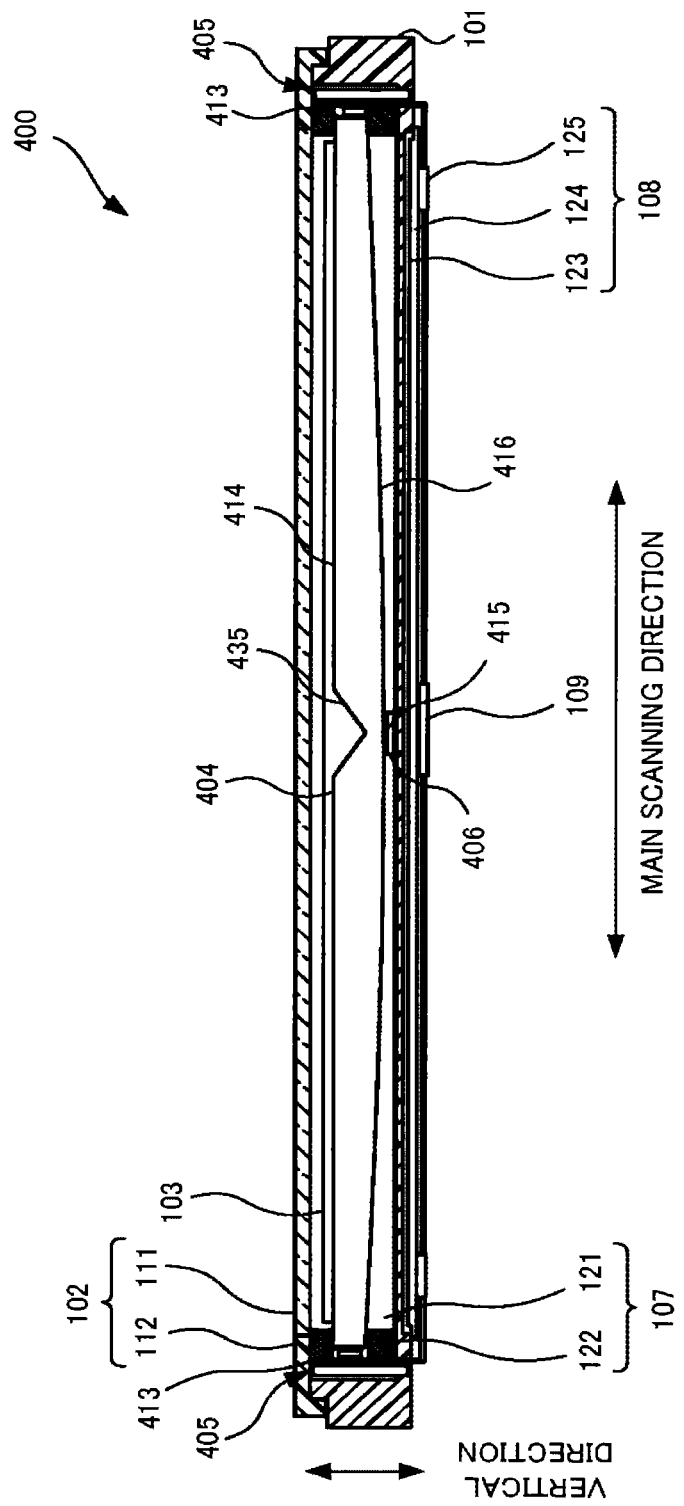
FIG. 12 is a sectional view of a contact image sensor according to a fourth embodiment of the present disclosure as viewed in a sub-scanning direction.

As shown in FIG. 12, which is a sectional view of the contact image sensor 400 according to the present embodiment as viewed in the sub-scanning direction, light guides 404 are members that extend in the main scanning direction and taper from the center toward both ends. A V-shaped notch 435 is provided on the top at the center. The section of the light guide 404 as viewed in the main scanning direction is, for example, in the form of an isosceles trapezoid having a wider base at the lower side, a first exit part 414 is provided on the upper surface of the light guide 404, and a second exit part 415 is provided on the lower surface of the light guide 404 positioned below the notch 435. A light diffusing layer 416 is provided on the lower surface of the light guide 404 except the second exit part 415.

Light source units 405 are positioned near the respective ends of the light guides 404, and LED chips of the light source units 405 are positioned facing the respective ends of the light guides 404. The corrective light receivers 406 are in the center of the light guides 404 in the main scanning direction and are positioned facing or in contact with the lower surface.

The contact image sensor 400 according to the present embodiment operates similarly as in the first embodiment. Light emitted from the light source units 405 thus enters from the each end (entrance part 413) of the light guides 404 and then propagates in the light guides 404 toward the center. A part of light propagating near the center of the light guide 404 is reflected downwardly by the V-shaped notch and emitted from the lower surface (second exit part 415) near the center of the light guide 404, and then received by the corrective light receiver 406. Then, the corrective light receiver 406 generates an electrical signal corresponding to the received light, and subsequently corrects bright output based on reference data generated from the electrical signal. Therefore, the stable bright output can be obtained as in the first embodiment.

Fifth Embodiment

A contact image sensor according to the present embodiment differs from the contact image sensor 100 according to the first embodiment in shape of light guides and arrangement of light source units and corrective light receivers.

Figure 13:
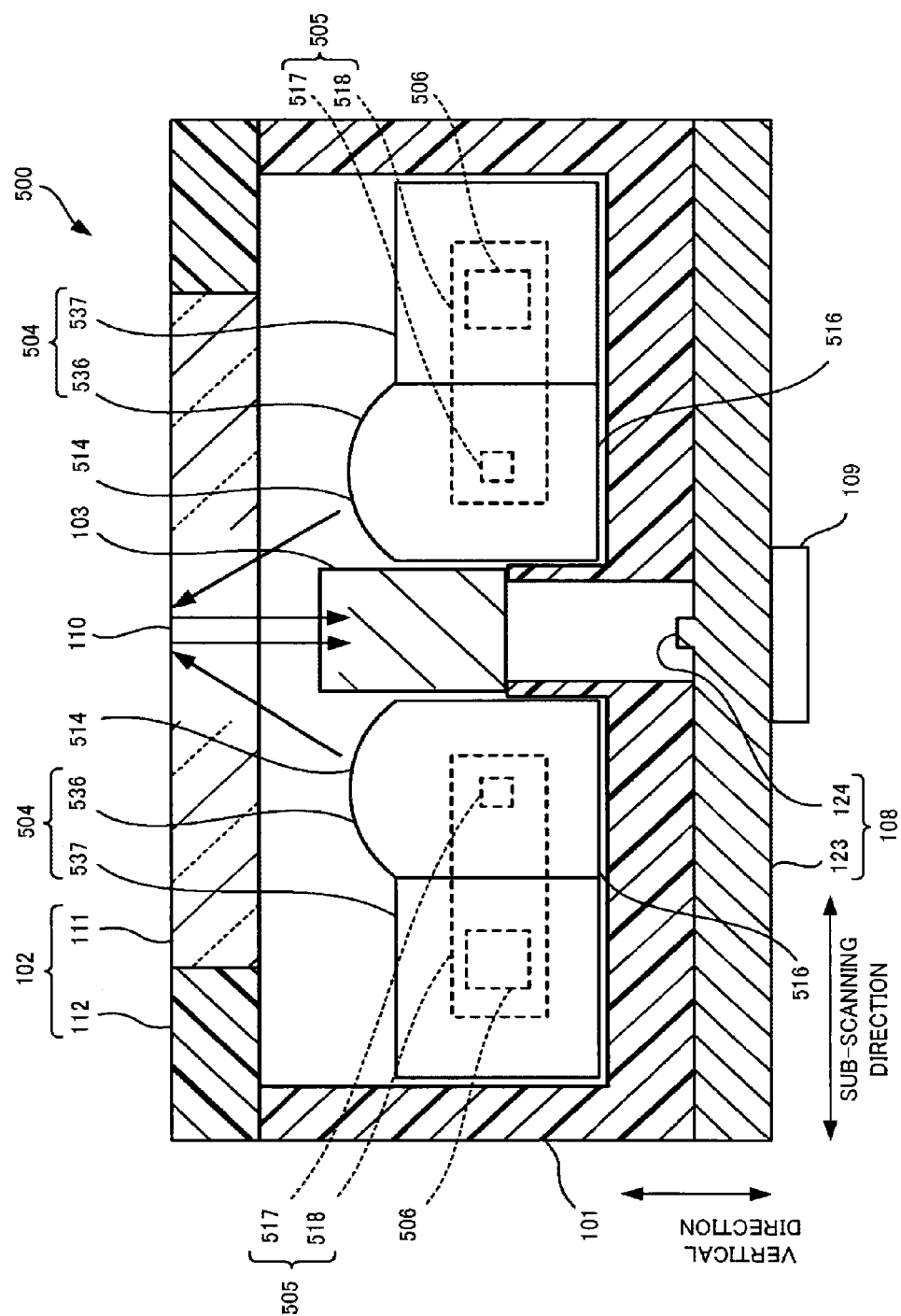
FIG. 13 is a sectional view of a contact image sensor according to a fifth embodiment of the present disclosure as viewed in a main scanning direction.

FIG. 13 shows the contact image sensor 500 according to the present embodiment as viewed in the main scanning direction. Each of the light guides 504 is a member having the same cross section extending in the main scanning direction, and integrally includes a fore section 536 located closer to the center of the frame 101 and a rear section 537 located closer to the side wall of the frame 101.

Figure 14:
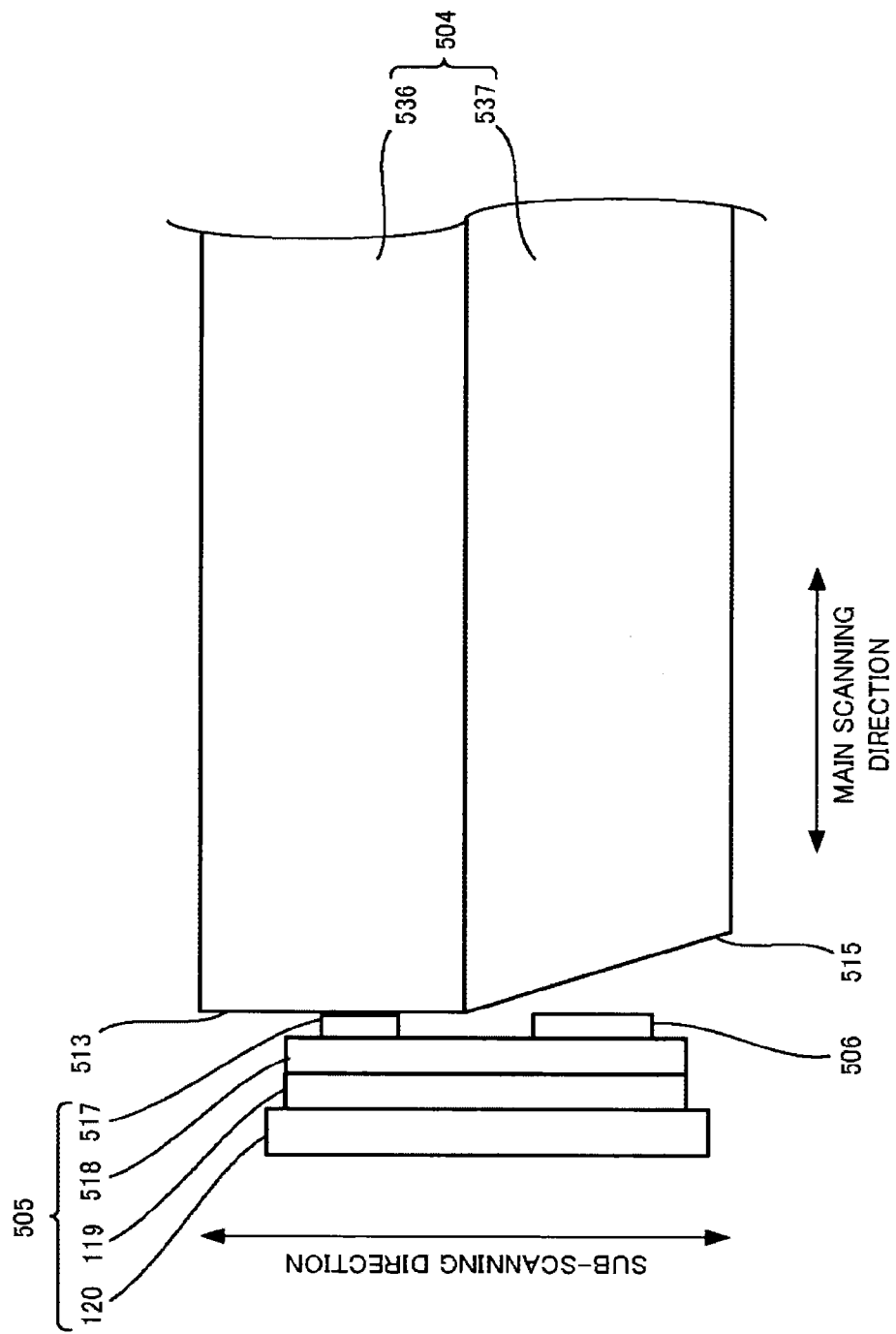
FIG. 14 is an enlarged view illustrating the vicinity of an end of a light guide, a light source unit, and a corrective light receiver, according to the fifth embodiment.

The fore section 536 has ends perpendicular to the main scanning direction and a first exit part 514 is provided on the top of the fore section 536. The rear section 537 has ends forming an acute angle with the interface between the rear section 537 and the fore section 536, as shown in FIG. 14, which is an enlarged plan view of a portion near the end of the light guide 504. A light diffusing layer 516 is provided on the bottom of the fore section 536 and the rear section 537, and a first exit part 514 is provided on the top of the fore section 536.

As shown in FIG. 14, LED chips 517 of the light source unit 505 and the corrective light receiver 506 are positioned facing the respective ends of the fore section 536 and the rear section 537. The corrective light receiver 506 is provided on an LED substrate 518 included in the light source unit 505, as in the first embodiment.

The contact image sensor 500 according to the present embodiment operates similarly as in the first embodiment. Light emitted from the light source unit 505 thus enters from the one end (entrance part 513) of the fore section 536 of the light guide 504 and then propagates in the light guide 504. A part of the light propagating in the light guide 504 is emitted downwardly from the other end (second exit part 515) of the rear section 537 of the light guide 504 and is received directly by the corrective light receiver 506. Then, the corrective light receiver 506 generates an electrical signal corresponding to the received light, and then corrects bright output based on reference data generated from the electrical signal. Therefore, the stable bright output can be obtained as in the first embodiment.

Sixth Embodiment

A contact image sensor according to the present embodiment differs from the contact image sensor 100 according to the first embodiment in shape of light guides and arrangement of light source units and corrective light receivers.

Figure 15:
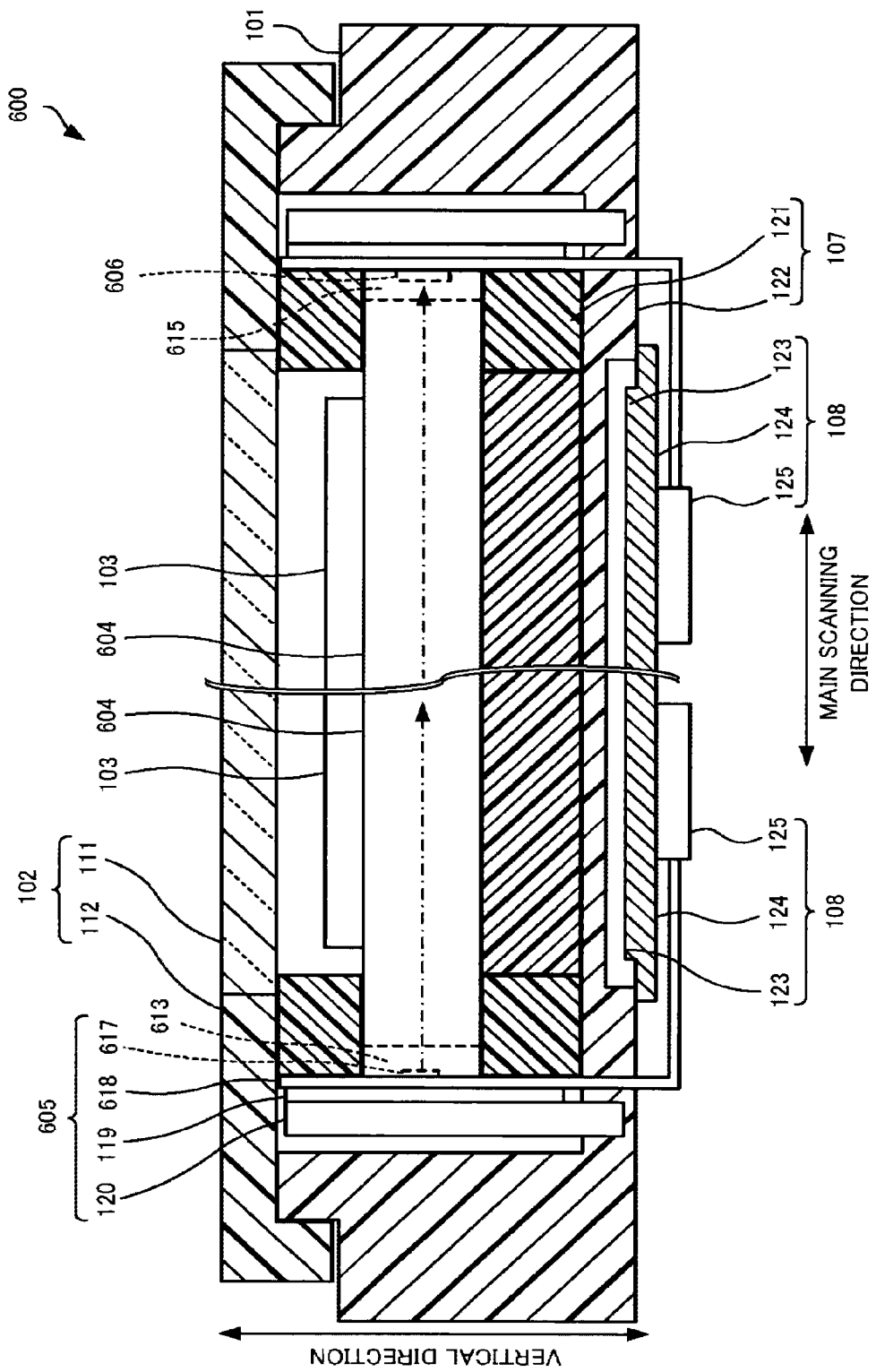
FIG. 15 is a sectional view of the contact image sensor according to a sixth embodiment of the present disclosure as viewed in a sub-scanning direction, illustrating an enlarged view of the vicinities of the ends of a light guide.
Figure 16:
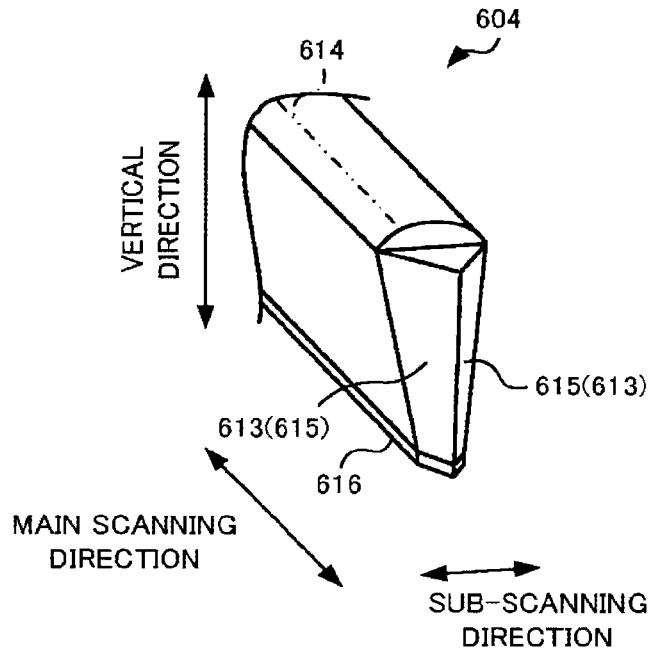
FIG. 16 is a perspective view illustrating the vicinity of an end of the light guide according to the sixth embodiment.

FIG. 15 shows a sectional view of the contact image sensor 600 according to the present embodiment as viewed in the sub-scanning direction. Light guide 604 is a member extending in the main scanning direction and having a section, for example, in the form of an isosceles trapezoid having a reduced width from the upper to the lower in the sub-scanning direction, as shown in FIG. 16, which is an enlarged perspective view of the vicinity of the end of the light guide. A light diffusing layer 616 is provided on the bottom of the light guide 604 and a first exit part 614 is provided on the top of the light guide 604. As shown therein, the end of the light guide 604 has a pair of inclined surfaces, and the inclined surfaces are provided symmetrically with respect to the vertical plane that is parallel to the main scanning direction.

Figure 17:
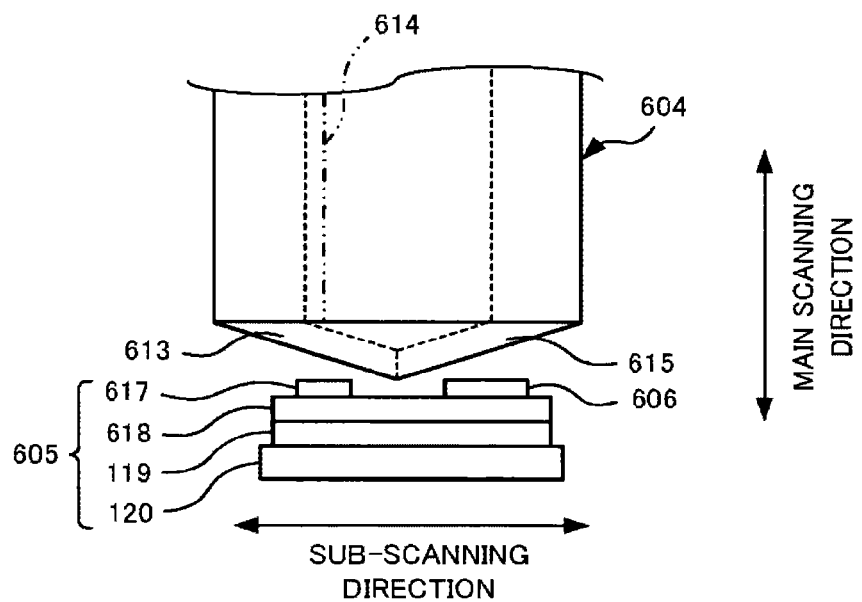
FIG. 17 is an enlarged plan view illustrating the vicinity of an end of the light guide, a light source unit, and a corrective light receiver, according to the sixth embodiment.

A light source unit 605 includes an LED board 618 and LED chips 617 mounted on the LED board 618, as shown in FIG. 17, which is an enlarged view of the vicinity of the end of the light guide 604 as viewed from above. The LED chips 617 are positioned facing one of the inclined surfaces of the light guide 604. A corrective light receiver 606 is provided on the LED board 618, and is positioned facing the other of the inclined surfaces of the light guide 604.

Note that the end of the light guide 604 can have a plurality of pairs of inclined surfaces symmetric with respect to a plurality of respective different faces and, for example, the corrective light receiver 606 can be positioned facing one of the inclined surfaces, while the LED chips 617 can be positioned facing the other respective inclined surfaces.

The contact image sensor 600 according to the present embodiment operates similarly as in the first embodiment. Light emitted from the light source unit 605 thus enters from one (entrance part 613) of the inclined surfaces provided on the one end of the light guide 604, and then propagates in the light guide 604. A part of the light propagating in the light guide 604 is emitted from the other (second exit part 615) of the inclined surfaces provided on the other end of the light guide 604 and is received directly by the corrective light receiver 606. Then, the corrective light receiver 606 generates an electrical signal corresponding to the received light, and then corrects bright output based on reference data generated from the electrical signal. Therefore, the stable bright output can be obtained as in the first embodiment.

Seventh Embodiment

A contact image sensor according to the present embodiment differs from the contact image sensor 100 according to the first embodiment in shape of light guides and arrangement of light source units and corrective light receivers.

Figure 18:
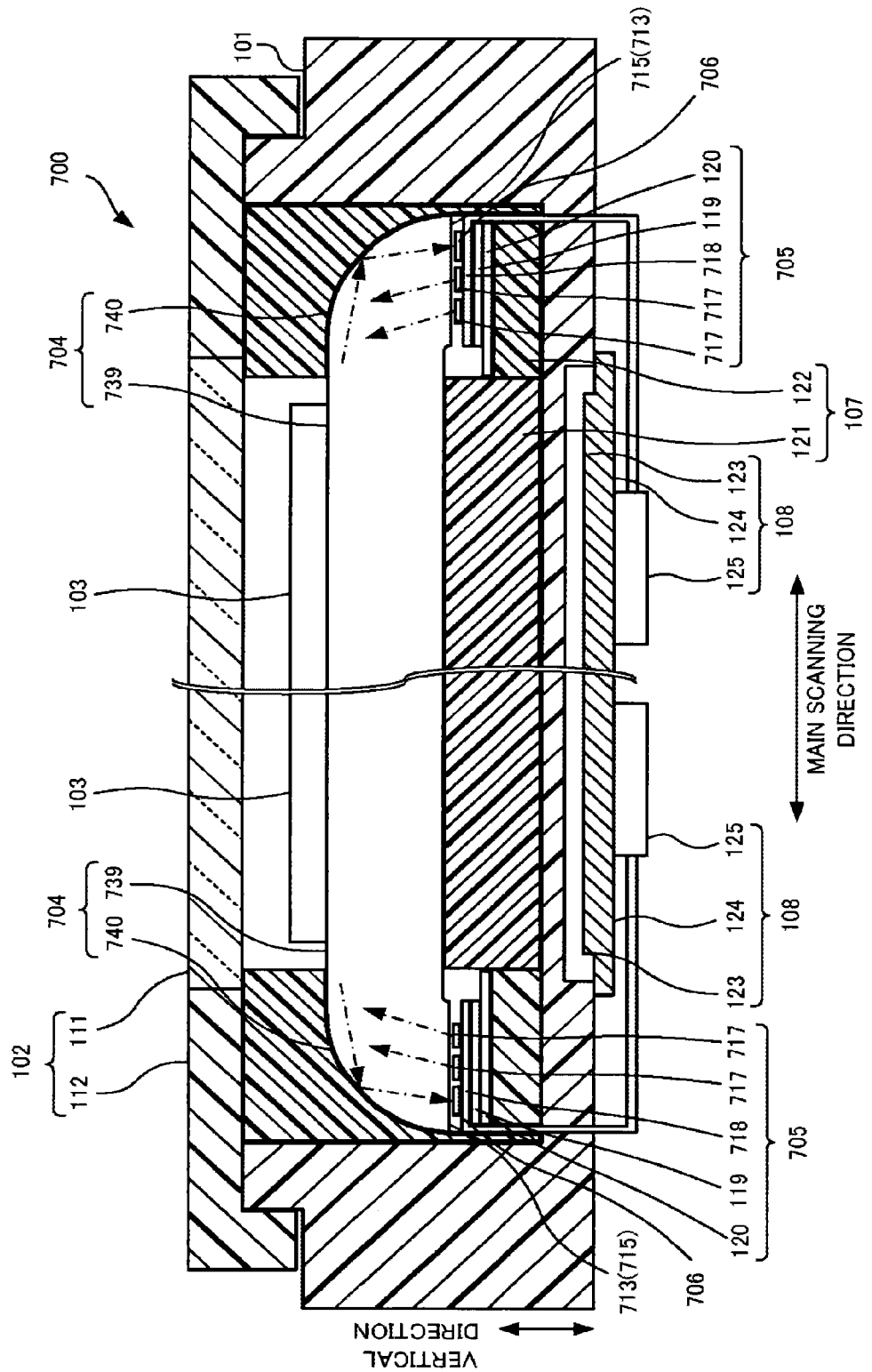
FIG. 18 is a sectional view of a contact image sensor according to seventh embodiment as viewed in a sub-scanning direction, illustrating an enlarged view of the vicinities of the ends of a light guide.

FIG. 18 is an enlarged view of light guide end portions 739 as the contact image sensor 700 is viewed in the sub-scanning direction. The light guide end portions 739 are portions located near the ends of the light guides 704 and having extension portions 740 extending in the main scanning direction. The extension portion 740 has a downwardly facing extended end and inclined surface having a shape with a portion of an elliptical profile extruded in the sub-scanning direction. As shown in FIG. 18, light source units 705 and corrective light receivers 706 are positioned facing the extended ends. The LED chips 717 of the light source units 705 are provided on an LED board 718, and the corrective light receivers 706 are also provided on the LED board 718.

The contact image sensor 700 according to the present embodiment operates similarly as in the first embodiment. Light emitted from the light source unit 705 thus enters from one (entrance part 713) of the extended ends of the light guide 704 and then propagates in the light guide 704. A part of the light propagating in the light guide 704 is emitted from the other end (second exit part 715) of the extended ends of the light guide 704 and is received directly by the corrective light receiver 706. Then, the corrective light receiver 706 generates an electrical signal corresponding to the received light, and then corrects bright output based on reference data generated from the electrical signal. Therefore, the stable bright output can be obtained as in the first embodiment.

Eighth Embodiment

In the first embodiment, the bright output is corrected by adjusting the amount of light from the LED chips 117. In the present embodiment, the bright output is corrected by adjusting an output level of a sensor body by an amplifier.

The contact image sensor according to the present embodiment has construction generally similar to the contact image sensor 100 according to the first embodiment. A controller 809 of the contact image sensor according to the present embodiment has a different construction from the controller 109 according to the first embodiment.

The controller 809 according to the present embodiment includes a comparative corrector 829 instead of the comparative corrector 129 according to the first embodiment, as shown in FIG. 19. The comparative corrector 829 causes the amplifier 125 to change the output level so that the content of the reference data meets the criterion represented by the criterion data. The content of the analog image data output from the sensor body 108 is thus changed, which enables obtaining the bright output.

The contact image sensor according to the present embodiment performs read processing and output correction processing similar to the first embodiment. In the present embodiment, in step S117 of output correction processing as shown in FIG. 8, the comparative corrector 829 adjusts the content of the analog image data by causing the amplifier 125 to change the output level.

In the present embodiment, the bright output is corrected by causing the amplifier 125 to control the output level. The amplifier 125 is provided in a typical contact image sensor. Therefore, an increase in the number of parts for correcting the bright output can be mitigated and the stable bright output can be obtained with a simple configuration.

Although the foregoing describes some example embodiments and variations of the present disclosure, the present disclosure is not limited thereto. The present disclosure has any appropriate combination of the embodiments and variations, and modifications added thereto as appropriate.

This application claims the benefit of priority based on Japanese Patent Application No. 2012-178137, filed on Aug. 10, 2012, the entire disclosure of which is incorporated by reference herein.

REFERENCE SIGNS LIST

100, 200, 300, 400, 500, 600, 700 Contact image sensor
101 Frame
102 Transmission body
103 Lens body
104, 404, 504, 604, 704 Light guide
105, 205, 405, 505, 605, 705 Light source unit
106, 206, 306, 406, 506, 606, 706 Corrective light receiver
107 Retainer
108 Sensor body
109, 809 Controller
110 Reading part
111 Transmissive section
112 Retaining frame
113, 213, 413, 513, 613, 713 Entrance part
114, 414, 514, 614, 714 First exit part
115, 215, 315, 415, 515, 615, 715 Second exit part
116, 416, 516, 616, 716 Light diffusing layer
117, 217, 517, 617, 717 LED chip
118, 218, 518, 618, 718 LED board
124 Reading converter
125 Amplifier
126 LED driver
127 Corrective A/D converter
128 Storage
129, 829 Comparative corrector
130 Synchronous controller
131 Reading A/D converter
132 Shading corrector

The invention claimed is:

1. A contact image sensor comprising:
a light source that emits light for irradiating a target to be read;
a light guide in which the light emitted from the light source and entering entrance parts disposed at both ends of the light guide in a main scanning direction propagates, the light guide having a first exit part for emitting the light to the target to be read and second exit parts disposed at the both ends of the light guide in the main scanning direction, for emitting the light to the outside;
a first corrective light receiver that (i) is disposed in an area receiving direct light of light that enters from one end of the light guide and is emitted from a second exit part of the other end of the light guide and excluding light that enters from the other end of the light guide and is emitted from the light source and (ii) outputs reference data corresponding to the direct light;

a second corrective light receiver that (i) is disposed in an area receiving direct light of light that enters from the other end of the light guide and is emitted from a second exit part of the one end of the light guide and excluding light that enters from the one end of the light guide and is emitted from the light source and (ii) outputs reference data corresponding to the direct light;

a reading light receiver that generates image data representing an image of the target to be read by photoelectrically converting the light emitted from the first exit part and reflected by the target to be read; and a corrector that compares (i) predetermined criterion data as a criterion value for determining whether or not to correct a bright output represented by the image data generated by the reading light receiver when the target to be read is white with (ii) reference data output from the first and second corrective light receivers and, based on a result of the comparison, performs processing for correcting the bright output.

2. The contact image sensor according to claim 1, further comprising:

a transmission body with an external surface, the external surface configured to be in close contact with the target to be read, the transmission body transmitting light emitted from the first exit part and light reflected by the target to be read, wherein the corrective light receiver is disposed in a portion of an area not irradiated directly by external light transmitted through the transmission body within the area receiving the direct light.

3. The contact image sensor according to claim 1, wherein the light source emits ultraviolet or infrared light as light for irradiating the target to be read.

4. The contact image sensor according to claim 1, further comprising:

a light source driver that controls an amount of light emitted from the light source and causes the light source to emit light, wherein the corrector compares the criterion data with the reference data output from the corrective light receiver and, based on the result of the comparison, causes the light source driver to emit an amount of light such that the content of the reference data meets a criterion represented by the criterion data.

5. The contact image sensor according to claim 1, wherein the reading light receiver comprises:

a reading converter that receives light emitted from the first exit part and reflected by the target to be read, and outputs a converted signal generated by photoelectrically converting the received light; and an amplifier that generates the image data by amplifying the converted signal output from the reading converter, and the corrector compares the criterion data with the reference data output from the corrective light receiver and, based on the result of the comparison, causes the amplifier to perform amplification such that the content of the reference data meets a criterion represented by the criterion data.

* * * * *